United States Patent [19]
Galbraith et al.

[11] Patent Number: 5,265,240
[45] Date of Patent: Nov. 23, 1993

[54] CHANNEL MEASUREMENT METHOD AND MEANS

[75] Inventors: Robert E. Galbraith, Rochester, Minn.; Steven G. Glassen, Wallkill; Assaf Marron, Poughkeepsie. both of N.Y.; Kenneth J. Oakes, Wappingers Falls; David E. Stucki, Poughkeepsie, both of N.Y.; Leslie W. Wyman, Poughkeepsie, N.Y.

[73] Assignee: International Business Machines Corporation, Armonk, N.Y.

[21] Appl. No.: 898,623

[22] Filed: Jul. 24, 1992

[51] Int. Cl.$^5$ .............................................. G06F 1/04
[52] U.S. Cl. ................................................... 395/550
[58] Field of Search ............... 395/275, 650, 550, 725; 364/265.5, 268.7, 270.6, 927.94, 927.99; 371/16.5, 19, 20.1

[56] References Cited
U.S. PATENT DOCUMENTS
4,497,022  1/1985  Cormier et al. ................... 395/550

Primary Examiner—Dale M. Shaw
Assistant Examiner—Moustafa M. Meky
Attorney, Agent, or Firm—Bernard M. Goldman

[57] ABSTRACT

Provides a method for measuring the busy utilization time for I/O channel used by any of plural operating systems (OSs) in a CEC. The measured utilization time for any OS excludes the time shared channels are utilized by other OSs during a measurement period. A channel measurement facility (CMF) is provided in the I/O subsystem hardware and microcode for each of the OSs in the I/O subsystem. The CMF is logically constructed because it uses only a small portion of I/O resources already existing in a CEC by adding microcode to control these resources to perform the time measurement function. The resources for a logical CMF including the partial use of: an I/O processor to store identifiers of an assigned OS, the partial use of channel processors controlling channels selected by the assigned OS during a measurement period, the local storage of each I/O processor, and OS storage needed for communicating the measurement data from the CMF to the OS. Any CPU can control a measurement by issuing "set channel measurement" instructions for starting and stopping a measurement performed asynchronously by the CMF to release the CPU for other independent CPU operations during a measurement period. The instruction can also be used to test the status of any CMF.

35 Claims, 13 Drawing Sheets

FIG. 2

| SCPM CODE | CRQB & CRPB ADDRESS |

FIG. 3A

| CRQB LENGTH | COMMAND CODE |
|---|---|
| OS IID | RELOCATION ZONE |
| KEY | OS SELECTION IID |
| CHANNEL MEASUREMENT BLOCK ADDRESS ||

FIG. 3B

| CRPB LENGTH | RESPONSE CODE |
|---|---|
| STATUS | |

FIG. 4

| | SAMPLE COUNT | |
|---|---|---|
| V | CHANNEL 0 BUSY TIME | |
| S | CHANNEL 0 TIMESTAMP | |
| V | CHANNEL 1 BUSY TIME | |
| S | CHANNEL 1 TIMESTAMP | |
| // | . . . | // |
| V | CHANNEL 255 BUSY TIME | |
| S | CHANNEL 255 TIMESTAMP | |

FIG. 5

| P | OS IMAGE ID | REL. ZONE | RESPONSE CODE |
|---|---|---|---|
| CRQB ADDRESS | | | |

FIG. 6

| | STATUS | KEY | REL. ZONE | CPMB ADDRESS |
|---|---|---|---|---|
| HYPERV. | | | | |
| OS 1 | " | " | " | " |
| // | | | | // |
| OS N | " | " | " | " |

FIG. 7A

| CHANNEL PROCESSOR CLOCK REGISTER (CPCR) |
| CHANNEL PROCESSOR START TIME REG.(CPSTR) |
| CHANNEL PROCESSOR END TIME REG.(CPETR) |

FIG. 7B

| V | ACCUMULATED BUSY TIME FOR HYPERVISOR |
| --- | --- |
| S | TIMESTAMP FOR HYPERVISOR |
| V | ACCUMULATED BUSY TIME FOR OS 1 |
| S | TIMESTAMP FOR OS 1 |
| | ⋮ |
| V | ACCUMULATED BUSY TIME FOR OS N |
| S | TIMESTAMP FOR OS N |

CHANNEL MEASUREMENT METHOD AND MEANS

INTRODUCTION AND INCORPORATION BY REFERENCE

This invention provides a channel-path-measurement facility within a channel subsystem for enabling a program to accumulate utilization information about operations on both shared and unshared I/O channel paths in a computer electronic complex (CEC) which supports the I/O resource sharing described and claimed in U.S. patent application Ser. No. 07/898,867 (PO9-92-016) filed on Jun. 15, 1992 and assigned to the same assignee as the subject application. The entire content of the following U.S. patent applications, are incorporated by reference into this specification: application Ser. No. 07/898,867 (PO9-92-016), entitled Method and Means For Sharing I/O Resources By A Plurality Of Operating Systems by F. W. Brice et al filed Jun. 15, 1992; application Ser. No. 07/898,977 (PO9-92-028), entitled Asynchronous Command Support For Shared Channels For A Computer Complex Having Multiple Operating Systems by M. P. Brown et al filed Jun. 15, 1992; application Ser. No. 07/898,875 (PO9-92-029), entitled Pass-Through For I/O Channel Subsystem Call Instructions For Accessing Shared Resources In A Computer System Having A Plurality Of Operating Systems by K. J. Fredericks et al filed Jun. 15, 1992.

Also, the following prior-filed applications assigned to the same assignee as the subject application have their entire content incorporated by reference into this specification: application Ser. No. 07/444,190, filed Nov. 28, 1989, by C. J. Bailey et al, entitled "Method And Apparatus For Dynamically Managing I/O Connectivity" (Docket Number KI989013); application Ser. No. 07/754,813, filed Sep. 4, 1991, by R. Cwiakala et al, entitled "Establishing Synchronization Of Hardware And Software I/O Configuration Definitions" (Docket Number PO991036); application Ser. No. 07/676,603, filed Mar. 28, 1991, by S. M. Benson et al, entitled "Method And Apparatus For Dynamic Changes To System I/O Configuration" (Docket Number PO990026); application Ser. No. 07/755,246, filed Sep. 5, 1991, by J. E. Bostick et al, entitled "Method And Apparatus For Dynamically Changing The Configuration Of A Logically Partitioned Data Processing System" (Docket number PO991028); and application Ser. No. 07/693,997, filed Mar. 28, 1991, by R. Cwiakala et al, entitled "Dynamically Changing A System I/O Configuration Definition" (Docket Number PO991012) U.S. Pat. No. 5,170,472 which issued on Dec. 8, 1992.

BACKGROUND

When measuring the utilization of I/O resources, prior art offers a variety of solutions and approaches. This invention proposes new methods and means which overcome most of the deficiencies in these prior art solutions.

In order to assess the prior art and to compare it with the proposed invention, the requirements for measuring the activity of an I/O resource are summarized as follows:

Measure the total amount of time in which an I/O resource is busy performing work on behalf of the measuring OS.

Provide this measurement for arbitrary time intervals for which the duration can be a few seconds to several hours.

Allow for arbitrary starting and ending point for any measurement interval.

Provide information which allows the measurement of multiple overlapping intervals of use of a I/O resource that is shared by multiple OSs. For example, while OS A measures the I/O resource activity between 8:00 and 9:00, another OS B should be able to measure the activity of its use the same resource between 8:30 and 9:05. The two OSs must be provided measurements which do not indicate the other OSs use of the shared I/O resource.

The measurements must be accurate within certain user-specified limits.

The overhead at the CEC must be minimal in performing the measurements.

The programming of a measuring program should be simple.

One existing approach uses statistical techniques for measuring channel utilization is to periodically examine the busy-status of the channel and estimate the total busy time based on statistical techniques. The advantage of statistical techniques is that no special activity counters are required at the channel. The disadvantages are:

There is no way to associate the state of the channel to a OS for which I/O activity is being carried out by the channel in a multi-OS CEC.

The frequent sampling has a significant overhead in terms of CPU and channel subsystem utilization.

In addition to the sampling activity, the OS needs to frequently translate these statistical samples into data which is useable by a multitude of other programs operating in the OS to make the measurements meaningful.

The precision of such a measurement is questionable if the frequency of sampling is reduced in order to minimize CPU overhead.

Measurement based on sampling is inaccurate as compared to continuous measurement.

The sampling may be biased by various constraints imposed by the design of the system.

Another prior sampling technique is to sample the channel utilization inside the channel itself, estimate the total utilization of the channel, and periodically store the information in memory available to the measuring OS. The advantage of this method is that the OS no longer needs to sample the channel frequently, or to translate results of sampling. The disadvantage is that such a technique cannot be extended to associate each channel activity with its originating OS, and apportion the observed busy time to the respective OS.

A third prior-art technique (presently used in measuring control unit queueing-related activity) maintains counters and accumulators at the channel subsystem, and stores the information only when requested by the OS. The advantage of this method is that CEC overhead is minimized when the measurement information is needed infrequently.

The disadvantage is that obtaining the information for very short intervals implies excessive CPU and channel subsystem overhead due to the frequent execution of the instruction used to request the information from the channel subsystem by the OS and the associated communications required between the CPU and the channel subsystem.

Prior-art device connect time measurement has the channel subsystem accumulate the duration of connect time for each I/O device, and increment a designated storage location at the completion of each I/O operation. The advantage is device-level granularity and high precision. However, the advantage of device level granularity is a disadvantage when total channel utilization measurements are required as it forces all device level measurements to be summed for the devices configured to a channel in order to determine total channel utilization.

Further, the prior art device level channel measurement does not provide individual utilization measurements for each of the plurality of channels to which a device may be configured. That is, the desired information regarding channel utilization cannot be obtained by adding device related information since a plurality of channels may participate in each I/O operation for each device. Further, storing all information from all participating channels at the completion of every I/O operation creates unacceptable overhead to the channel subsystem.

Lastly, none of the prior art I/O resource measurement facilities provide the capability of measuring selective utilization of I/O channel resources shared by separate OSs in a CEC in which I/O channel resources can be dynamically shared among a plurality of OSs.

The following cited applications are background to this application and are assigned to the same assignee as this application: application Ser. No. 07/444,190, filed Nov. 28, 1989, by C. J. Bailey et al, entitled "Method And Apparatus For Dynamically Managing I/O Connectivity" (Docket Number KI989013); application Ser. No. 07/754,813, filed Sep. 4, 1991, by R. Cwiakala et al, entitled "Establishing Synchronization Of Hardware And Software I/O Configuration Definitions" (Docket Number PO991036); application Ser. No. 07/676,603, filed Mar. 28, 1991, by S. M. Benson et al, entitled "Method And Apparatus For Dynamic Changes To System I/O Configuration" (Docket Number PO990026); application Ser. No. 07/755,246, filed Sep. 5, 1991, by J. E. Bostick et al, entitled "Method And Apparatus For Dynamically Changing The Configuration Of A Logically Partitioned Data Processing System" (Docket Number PO991028); and application Ser. No. 07/693,997, filed Mar. 28, 1991, by R. Cwiakala et al, entitled "Dynamically Changing A System I/O Configuration Definition" (Docket Number PO991012) U.S. Pat. No. 5,170,472 which issued on Dec. 8, 1992.

SUMMARY OF THE INVENTION

The solution offered in this invention combines the following:

Each channel performs precise accumulation of individual busy time for each of the plurality of OSs that share it.

Each channel periodically stores this information in an area available to the I/O subsystem. The frequency of this storing operation is low enough to not cause any noticeable overhead.

When storing the cumulative measurements, the channel processor also stores a time-stamp associated with the measurement value. This time-stamp allows a delayed examination of the measurement value by the OS, to be adjusted to the desired precision, and reflects accurate channel utilization at a recent interval. If these time stamps are not provided, the precision of the measurement can be dramatically affected by the frequency of which measurement data is stored. Infrequent storing allows for low overhead and high inaccuracies. Frequent storing requires high overhead but improves the accuracy. The time stamp allows for both the desired infrequent storing with high accuracy.

The channel subsystem periodically moves the information stored by the channel processors into OS storage. The time stamps are preserved, and thus the delay in this periodic move operation can also be taken into account as presented above.

The invention provides a channel-measurement facility (CMF) usable by a control program in a CEC. It is particularly useful when used by any OS of plural OSs in different logical partitions of a CEC. Each CMF, for each OS, supports continuous time measurements of the busy states for any channel, including shared and unshared channels operating for a respective OS, whether a channel is switched among I/O devices or not during a measurement time period, or whether the channel is switched among a plurality of OSs or not during the measurement time period. For shared channels, the operation of this invention is dependent on the use of the invention described and claimed in USA patent application Ser. No. 07/898,867 filed Jun. 15, 1992 (PO9-92-016), which describes a novel I/O resource control method and means that enables an I/O resource (such as an I/O channel, subchannel (device) and control unit) to be dynamically shared (or operated unshared) by a plurality of operating systems (OSs) executing in a CEC.

Application Ser. No. 07/898,867 filed on Jun. 15, 1992 (PO9-92-016) describes a method for increasing the connectivity of I/O channels to a multiplicity of operating systems (OSs) running in different logical resource partitions of a computer electronic complex (CEC) to obtain sharing of the channels among the OSs in the CEC. That application discloses the use of image identifiers (IIDs) for assigning I/O resources to different OSs. In the channel subsystem of a CEC, each shared I/O resource is provided a sharing set of control blocks (CBs) in which a respective CB is assigned to (and located by) a respective IID of one of the OSs running in the CEC. Each of the CBs in a sharing set provides a different image to each OS of the same I/O resource. The different CB images are independently set to different states by I/O operations with the resource for the different OSs, so that the OSs can independently operate the same I/O resource without regard to the order of use of the resource by the OSs. The IID used in executing an I/O request by an OS is transmitted to the I/O control unit used to access a requested I/O device and is stored by the control unit as part of the logical path connecting to the control unit for later use by the control unit in responding back to the requesting OS for the I/O request.

This invention deals with measurements of channel busy time in the utilization of each channel for a particular OS whether the channel use is shared or unshared by plural OSs during the measurement period. The invention directly and accurately measures the channel busy time without using any sampling means for the measurement of the channel busy time. For this purpose, the channel-measurement facility operates asynchronously with the CPU requesting the measurement by off-loading the direct measurement functions from a requesting CPU to channel processors asynchronously operating in the I/O channel subsystem. When the asynchronous measurement operations are completed, they are periodically updated for the OS.

The preferred embodiment of the invention provides a new CPU instruction for use by OS control programs to request a channel measurement operation for that OS whether or not the control program is operating under an OS in a multi-OS CEC or in a single OS CEC, and whether or not the channel is shared or not with other OSs during the measurement period. The CPU instruction is used to start a measurement operation by the channel-measurement facility for the requesting OS. Also, the CPU instruction is used to stop the measurement operation by the channel-measurement facility for the requesting OS. Further, the CPU instruction is used to test the status of the channel-measurement facility for the requesting OS, such as whether the facility is active in a measurement operation, or is in a stopped state, or is in an error state.

The time measurement itself is relegated to the channel processor that is directly controlling the channel itself. The result is that CPU overhead for channel busy time measurement remains constant and does not increase as the frequency of channel busy sampling increases, as in prior art.

To efficiently perform the direct time measurement operations, the channel-measurement facility for each requesting OS is located in the hardware/microcode of the CEC's channel subsystem, which includes asynchronously operating processors that control the channel operations, including starting, stopping each channel, and testing the status of the channel measurement facility.

The asynchronously operating processors in a CEC's channel subsystem may include I/O processors (IOPs) for passing CPU requested I/O work to the channels, and may further include channel processors that receive the work requests from the IOPs to directly control the operation of the respective channels. Each channel processor may be shared among a plurality of channels, or each channel processor may be dedicated to a particular channel. The preferred embodiment herein uses the latter method of each channel having its own dedicated channel processor, which then continuously controls and monitors the busy state of its channel.

The CEC microcode for starting, stopping, and testing the channel measurement facilities for each OS is preferably located with the IOPs and channel processors to eliminate the need for the CPUs having this microcode, since the CPUs are already heavily burdened with having excessive microcode for the tremendous number of functions required of the CPUs.

The result is that the CPU instruction provided by this invention only communicates the start, stop, or test function to the IOPs and channel processors of the channel subsystem, and only returns completion information to the OS. The channel subsystem in turn asynchronously and periodically provides, with no CPU overhead, the direct and continuous measurements of the busy/non-busy state of all channels configured to each respective OS, whether or not any of the channels are being shared with another OS.

The CPU instruction is called a "set channel-measurement" (SCM) instruction in the preferred embodiment described herein. When the CEC is operating with shared channels, the SCM instruction causes the channel subsystem to measure only the portion of use of the shared channel by the requesting OS, or for the OS of a requesting program operating under the OS. The proportionate use of a shared channel by each of the other sharing OSs is not reported to the requesting OS, but is reportable to each of those other OSs.

The ability of a CEC to operate with both shared and unshared I/O resources is obtainable when the CEC is using either a microcoded hypervisor or software hypervisor. The SCM instruction may be used to start or stop measurements for any one of multiple OSs operating in a CEC with either of these types of hypervisor. Also with either such hypervisor, the SCM instruction may be used to test the status of a channel-measurement facility by any specified OS in a CEC having multiple OSs.

When active in the channel subsystem of a CEC, a channel-measurement facility continuously accumulates channel-measurement information in the channel processors of the CEC. However, the resources of the CEC are affected by the number of times that the measurement data is communicated to the OS requesting that data. Experience indicates the data need not be communicated continuously to the OS, but it is sufficient that it be communicated either periodically over a relatively long time period or by using a special CPU instruction to obtain the updated data for the OS, both of which are comprehended by this invention. Periodic reporting has the advantage of not burdening the OS with having to have software that needs to be periodically invoked to perform the updating process, and eliminates having to burden the CPU with additional instructions in its repertoire. The disadvantage of periodic reporting is in it not being guaranteed to be timely for long periodic intervals, which is minimized for channel-busy-time measurements not needing to be reported in an extremely timely manner.

For periodic reporting, it has been found that an interval of seconds may be effectively used, such as by using a 4 second interval for updating the channel-busy information provided to the OSs.

It has been found preferable not to have the channel processors directly report their channel busy times to the respective OSs, but instead to first report to control blocks accessible only to the hardware/microcode in the CEC. For example, the channel processors may report their continuous measurements of channel busy times for the respective CMF's at 2 second time intervals, which is no significant burden on either the channel processors or the hardware/microcode in the CEC. And every 4 seconds the updated measurements in hardware/microcode control blocks may be periodically copied to control blocks in the OS's assigned storage in the CEC to make the information available to the respective OSs.

In addition, any OS may be enabled to obtain channel measurement data for another selected OS in the CEC. This operation is subject to all security and authority controls among the OSs in the CEC. It is controlled by an OS issuing a measurement instruction identifying another OS in the CEC for which a measurement is to be made. An OS may issue multiple measurement instructions for concurrently having measurements made for a plurality of different other OSs.

In addition, any OS may obtain channel path measurement data for another selected OS. This operation is subject to all security and authority controls among the OSs in the CEC. It is controlled by an OS issuing a measurement instruction identifying another OS for which a measurement is to be made. An OS may issue multiple measurement instructions for concurrently requesting measurements for a plurality of different other OSs.

Measurement Control By Another OS

An OS can control a channel utilization measurement for another OS. To do this, an OS issues the "set channel measurement" (SCM) instruction after setting an "OS selection IID" field in the associated command request block (CRQB) to the IID of the other OS for which a measurement is to be made; see FIG. 3A.

Then in the CRQB, the IID in the "OS selection IID" field is used instead of the IID in the "OS image ID" field to specify the CMF which is to be the subject of this SCM instruction.

The value of the "OS selection IID" field is set to zero when the "OS image ID" field is used to designate the requesting OS as the OS to be measured.

In response to selection of an IID other than that of the requesting OS, the command processing, data collection, data movement and error handling, by the CMF are carried out in the same manner as is done when an OS starts its associated CMF; and all the steps previously described are carried out, with the following exceptions:

When the CMF for a given OS is stopped and a SCM start command is issued by any OS for the data associated with this CMF, then the measurement for this CMF commences in the same manner as if the command was issued from the OS associated with the CMF. Then, the requesting OS is registered by an IOP as a recipient of the CMF data for the current measurement.

The IOP registers all OSs which have active CMFs. The IOP status block in FIG. 6 indicates the optional registration of each OS to receive CMF data. The IOP status block (in FIG. 6) may be replicated for this purpose. The IOP maintains for each OS for which data is collected a separate IOP status block, which lists all the OSs which are registered to receive data for this OS. This registration includes the CMB address in which the requesting OS wishes to receive information about the target OS.

When the CMF for a given OS is started and is operational, and a subsequent request is issued by any OS which is not already registered to receive CMF data for the selected OS, then the requesting OS is registered as an additional recipient of the CMF data. The measurement activity for the selected OS is not affected.

Periodically, the IOP moves the data associated with a given OS to the CMBs in the memory of each OS which is registered as a recipient of data for this OS.

When the CMF for a given OS is active and a SCM Stop request is issued by any OS, the requesting OS is removed from the list of OSs registered to receive CMF data from the selected CMF. If as a result, no OSs are registered to receive CMF data for the selected OS, the CMF for that OS stops, as described in previous sections.

When an OS issues a SCM test request selecting an arbitrary OS, then the results stored reflect the state of the CMF for the target OS if and only if the requesting OS is registered as a recipient of data for the selected OS. Otherwise, the response to the test request indicate that the CMF for the selected OS is stopped.

The obtaining of data by other OSs uses hypervisor authorization and security control mechanisms existing in the prior art to provide security control by which the operator or the system administrator can specify for each logical partition, whether or not it is authorized to receive CMF data for any or all other OSs. When an authorized OS issues a SCM start request selecting another OS, processing is as described in this section. Otherwise, the start request fails, and a specific response code associated with this failure is stored in the Command Response Block.

Normally an OS running in a partition of a CEC is guaranteed by the CEC hypervisor that it does not have to know its own IID or the fact that it is running in a logical partition environment. This allows each OS to execute as if it is the only OS in the CEC, if it wants to. To any OS which wants to be aware of other OS partitions, it can obtain its own IID, as well as the IIDs of other OS partitions, using prior art services of the CEC hypervisor, via files which describe the system configuration and are available for use by authorized OSs.

If an OS wants to concurrently measure the I/O channel activity of multiple other OSs, the requesting OS issues multiple SCMs instructions, each SCM instruction designating one of the other OSs in its "OS selection IID" field in its associated command request block (CRQB). A separate CMB is needed for each such request.

Brief Description of The Drawings

FIG. 2 represents a "Set Channel-Measurement" (SCM) instruction.

FIG. 3A shows a "Command Request Block" (CRQB) which may be located in any one or more of MS-1 through MS-N assigned to the respective OSs in the CEC.

FIG. 3B shows a "Command-Response Block" (CRPB), which like the CRQB, is located in any one or more of MS-1 through MS-N assigned to the respective OSs in the CEC.

FIG. 4 shows a "Channel-Measurement block" (CMB) which, like the CRQB and CRPB, is located in any one or more of MS-1 through MS-N assigned to the respective OSs in the CEC.

FIG. 5 shows a "CPU-IOP Communications Block" (CICB) which is located in the CEC's HSA (hardware system area) which is not accessible by the OSs.

FIG. 6 shows a "IOP Status Block" (IOPSB) located in the HSA, which indicates the status of all channel-measurement facilities.

FIG. 7A shows a Channel Processor Clock Register (CPCR), a Channel Processor Start Time Register (CPSTR), and a Channel Processor Ending Time Register (CPETR). One each of these registers are provided by each channel processor.

FIG. 7B shows a Channel-Processor Measurement Block (CHMB) in the local storage of each channel processor.

FIG. 10 is a flow diagram showing steps for performing validity checking for the execution of the "set channel-measurement (SCM) instruction.

FIG. 11, FIG. 12 and FIG. 13 are flow diagrams showing sub-sequences of steps done by an I/O processor for providing operations for the "set channel-measurements" (SCM) instruction.

Detailed Embodiment of The Invention

Figure 1:
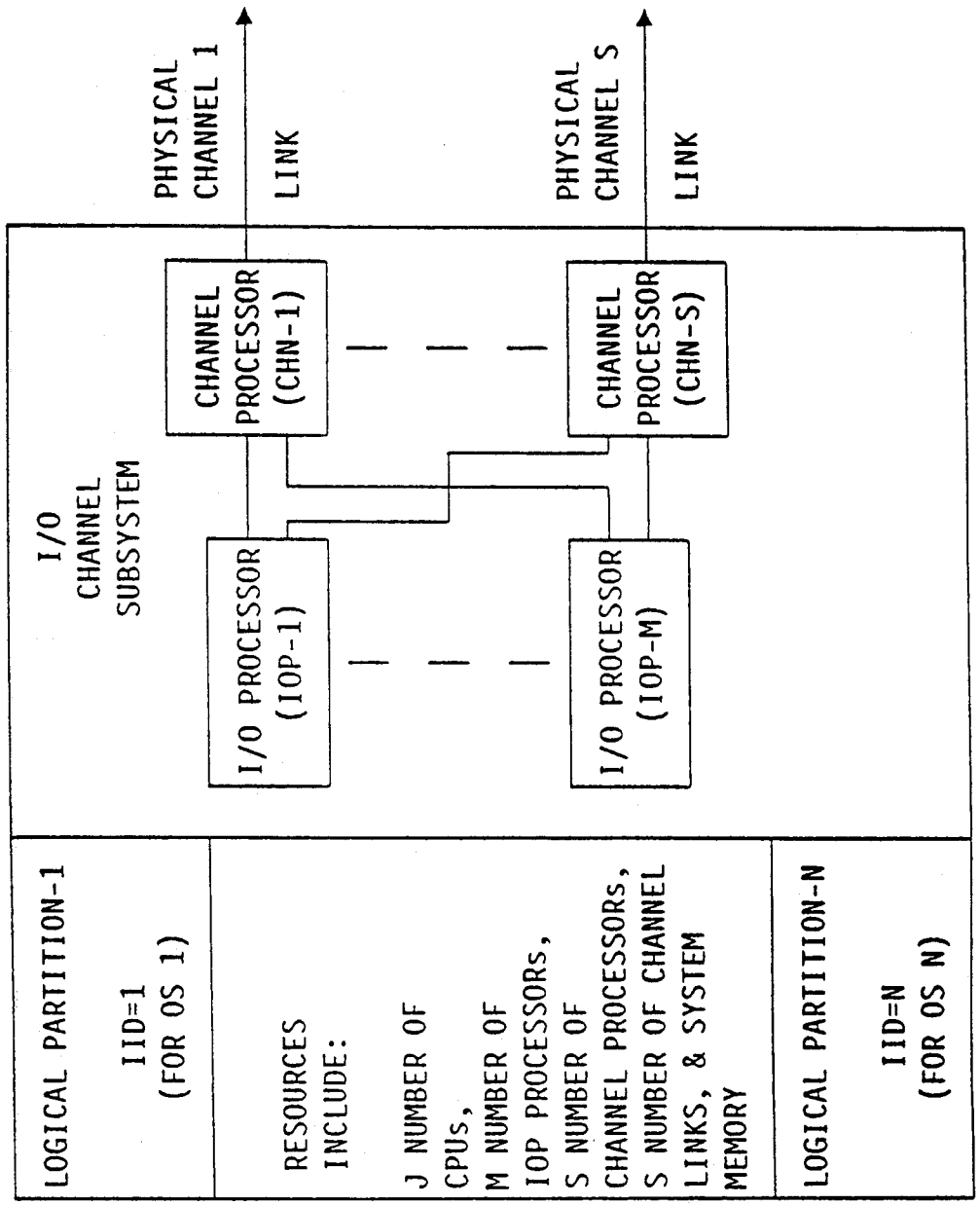
FIG. 1 shows a CEC having its CPUs, I/O Channel Subsystem, and storage resources logically divided among logical partitions 1 through N.

FIG. 1 shows a CEC having central processing complex (CPC) resources partitioned among logical resource partitions 1 through N. A hypervisor is located in partition 0, OS-1 through OS-N are respectively located in partitions 1 through N. Each partition has a part of the CEC's main storage (MS) resource exclusively assigned to it, which are designated MS-1 through MS-N.

A hardware microcoded hypervisor is assigned in the CEC of FIG. 1 which does not need a visible CEC partition. If instead, a software hypervisor is used in the CEC, then a partition 0 is assigned to the software hypervisor.

The I/O channel subsystem resources (channel resources) are not partitioned among the OSs as the CPU resources may be. The invention in patent application Ser. No. 07/898,867 filed Jun. 15, 19882 (PO9-92-016) allows all of the I/O resources (including the channel resources) to be shared by the OSs in the different CPC partitions, and allows other of the I/O resources to be unshared by dedication to an assigned OS. The embodiments in patent application Ser. No. 07/898,867 filed Jun. 15, 1992 (PO9-92-016) are incorporated herein by reference as having the measurement facilities described in this specification.

Channel-Time Measurement Logic

Figure 14:
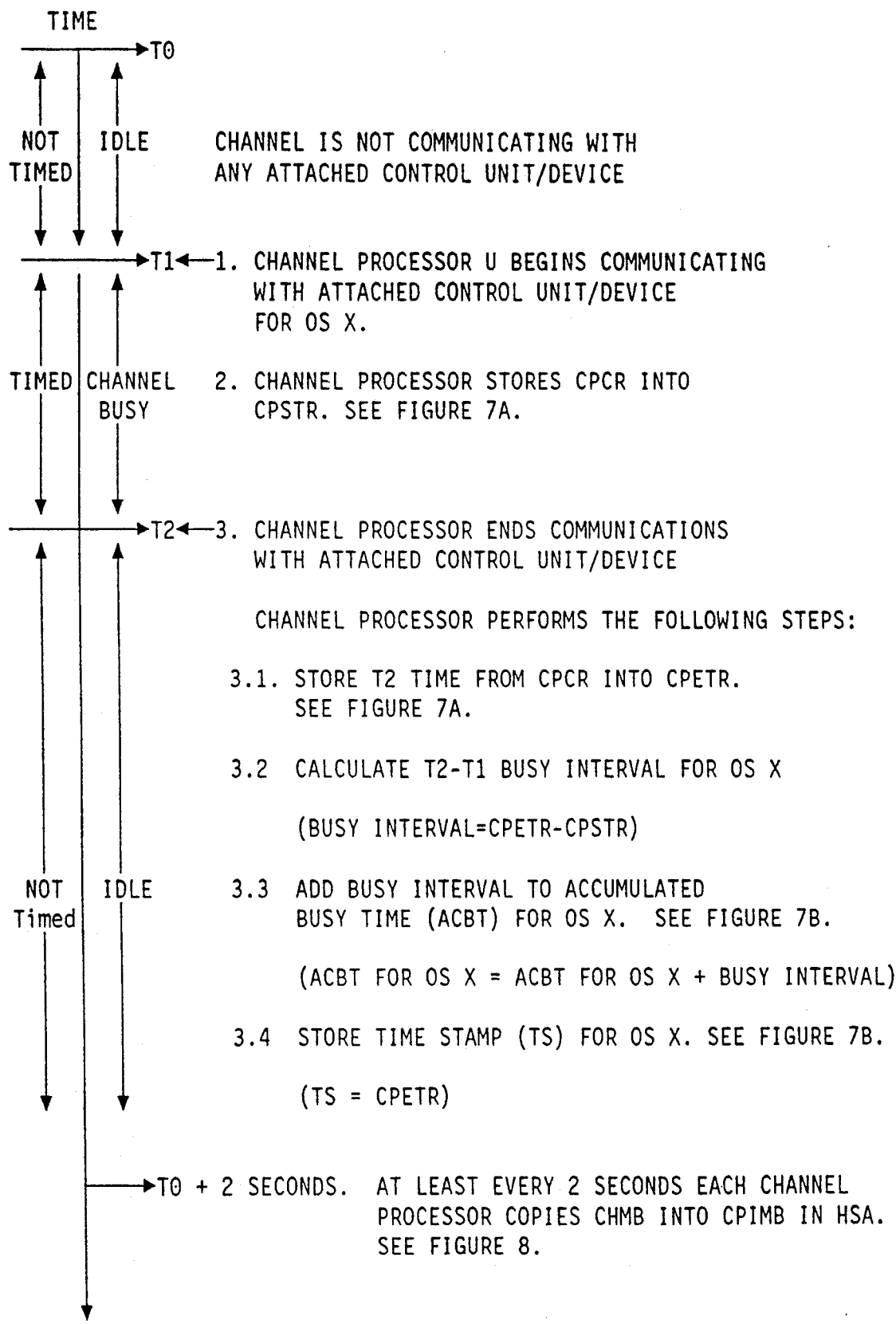
FIG. 14 is a timing diagram representing processes done for the preferred embodiment of the invention by circuits and microcode in each of the channel processors in the CEC for the purpose of measuring and accumulating channel utilization measurements for each of the OSs that share any channel processor.

FIG. 14 is a timing diagram representing processes done for the preferred embodiment of the invention by circuits and microcode in each of the channel processors in the CEC. There are up to 256 channel processors in the CEC. One channel processor for each channel is represented by a Channel Identifier (CHPID). Any subchannel control block or shared subchannel control block in the I/O channel subsystem may specify up to 8 CHPIDs usable to the subchannel.

In FIG. 14, time T0 represents a starting time for the operation by any channel processor.

The channel timing in FIG. 14 occurs whether or not this timing is used for measurement. The timing is only used for a measurement by a CMF if the SCM instruction is executed by and OS with a CRQB start command and the channel is being used by that OS.

During the period from T0 to T1, the channel is in an idle (not busy) state, and no time accumulation is being done by the channel processor.

Time T1 occurs whenever the channel is selected for a channel-path communication such as by a start subchannel (SSCH) instruction executed by some OS and the timed period begins for the channel during which the channel processor measures the busy time for the OS using it.

The channel processor has an internal clock which updates its clock time by one at some constant rate (such as every 128 microseconds). The channel processor clock time is an absolute time value posted in a clock register (CPCR shown in FIG. 7A), which is used by the channel timing process.

At time T1 (when the channel processor starts a busy period), the channel processor stores the absolute clock time from the clock register into the "start time register" provided by the processor (CPSTR shown in FIG. 7A). Whenever the channel processor ends its operation at time T2 and goes to an idle (not busy) state, the channel processor stores the absolute clock time from the clock register into the "ending time register" provided by the processor (CPETR shown in FIG. 7A). The channel processor then performs a subtraction operation of T2−T1="busy time interval" for the requesting OS by subtracting the value in the "start time register" from the value in the "ending time register". Next, the channel processor adds the resulting "busy time interval" to the "accumulated busy time" for the respective OS (shown in FIG. 7B).

In order to correlate the accumulated busy time, if any, for each respective OS with the time interval in which the busy activity occurred, the channel processor stores a "time-stamp" value for each OS if that OS had any activity during the timed interval. For example, every 2 seconds, the channel stores the contents of the channel-processor clock register (CPCR) into the time-stamp field for each OS that was busy during the previous 2 second time interval (as shown in FIGS. 7A and 7B). When no channel activity occurs for an OS during the 2 second interval, the "time-stamp" for that OS is not updated.

The accumulated busy time and time-stamp (shown in FIG. 7B), together represent a measurement set for an OS. The set is shown as an "accumulated busy time for OS-x", and a "time stamp for OS-x" register. A separate measurement set is provided for the hypervisor and for each of the respective OSs configured in the CEC that are configured to share the channel processor, and are located in the channel processor's local storage.

FIG. 7B shows a "Channel Processor Measurement Block" (CHMB) provided in the local storage of each channel processor. The CHMB contains the accumulated busy time and time-stamp values for each OS that uses the channel. There are up to 256 CHMBs in the CEC's channel subsystem representing up to 256 physical channels supported by the corresponding up to 256 channel processors that may exist in a CEC.

The contents of the respective CHMB's in the local storage of each of the channel processors in the CEC are periodically copied to the measurement sets in the channel images measurement block (CIMB) block in the CEC's HSA, for example they may be copied every 2 seconds.

And periodically, these measurement sets in the CEC's CIMB in the CEC's HSA are copied to the channel measurement blocks (CMBs) in the main storages in the logical partitions of the respective OSs, for example they may be copied every 4 seconds.

These control blocks in the CEC's hardware system area and in the main storages in the logical partitions of the respective OSs are described in detail later in this specification.

Set Channel Measurement (SCM) Instruction for OS

FIG. 2 shows an example of a "set channel-measurement" (SCM) instruction, which may be used by a program running under any OS (which must be located in the MS space of that OS). The SCM instruction is used by an OS program to start, stop and test the status of a "channel-measurement facility" (CMF) provided for the respective OS. That facility measures the amount of use of every channel (shared or unshared) configured to that OS over the time period between SCM start and stop commands. That is, measurements are made over a time period controlled by executing a first SCM instruction to start the facility and later executing a second SCM instruction to stop the facility. The preferred form of the SCM instruction requires it to be executed only when its CPU is in supervisory state.

Accordingly, SCM instructions are used by the OS program to communicate a channel measurement command to the CEC hardware/microcode comprising the I/O channel subsystem in which the "channel-measurement facility" is structured, which will perform the command for the measurement request. OS programs cannot access structures in the CEC hardware/microcode, except through the limited capability provided by special instructions architected for a specific purpose, such as the SCM instruction.

Many different formats may be arbitrarily provided for the SCM instruction such as providing it with a single operand, or two operands or three operands, although the one operand form is shown in FIG. 2. In whatever instruction format used, the SCM instruction locates three distinct operands, which are a "command-request block" (CRQB) in FIG. 3A, a companion "command-response block" (CRPB) in FIG. 3B, and a channel measurement block (CMB) in FIG. 4. Previous to execution of the SCM instruction, the CRQB, CRPB and CMB are located and constructed by the OS program. Also, the OS program puts information in some of the fields in these blocks for being sent to the channel measurement facility, which is located in the hardware/microcode of the I/O channel subsystem where it is not accessible to the OS program. In FIG. 2, a one explicit operand and two implicit operands form of the SCM instruction is illustrated. The first (explicit) operand locates the command request block (CRQB) for the CPU. The second (implied) operand, the command response block (CRPB), is located by the CPU directly after the location of the first operand and the third (implied) operand, the channel measurement block (CMB), is located from a field in the first operand (the CRQB). Thus, a one explicit operand form of the SCM instruction would locate a block from which the other implicit operands are located, which is the form used in the IBM S/390 architecture.

The SCM instruction with a start command in its CRQB command code starts the operation of the channel-measurement facility (CMF) for the specified OS. The channel-measurement facility for each OS includes the channel processors, I/O processors (IOPs) that drive the channel processors, and associated control blocks in the HSA (hardware system area) of CEC storage that is not accessible to the OSs.

When started, the CMF collects information about the busy state of the channel images in its channel processor local storages. That information is periodically posted into the control blocks in the HSA into the channel-images measurement block (CIMB), in FIG. 8. Then, this information in the CIMB is periodically posted by the microcode-controlled CMF from the microcode-accessible control block, CIMB, into an OS-accessible control block (the channel measurement block (CMB), in FIG. 4). The OS program can at any time access only this information in the OS-accessible control block.

Once a channel-measurement facility is started by executing a SCM instruction, the facility remains active until it is stopped by the occurrence of one of the following conditions:

1. Another SCM instruction is executed by the associated OS with the stop command indicated in its CRQB. Only the channel-measurement facility for the specified OS is stopped. The channel-measurement facilities for the other OSs are unaffected, and may continue operating. In non-hypervisor mode and in hardware hypervisor mode, no OS image number need be specified. In software hypervisor mode, the OS image number is implicitly specified for the requesting OS when the SCM instruction is interpretively executed in passthru mode or is explicitly specified in the CRQB by the hypervisor when the SCM instruction is not interpretively executed.
2. When a CEC power-on-reset or CEC system reset is performed, all channel-measurement facilities for all OSs are stopped.
3. If a channel-measurement facility enters an error stopped state, only the channel measurement facility having the check-stop condition is stopped.
4. If the CEC or its channel subsystem enters the check-stop state, all channel-measurement facilities (provided for all OSs) are stopped.
5. If a "OS image reset" function is executed by the hypervisor, only the channel-measurement facility for the specified OS is stopped.
6. If a program check, protection check, uncorrected storage error, or uncorrected storage-key error is detected by the channel subsystem when attempting to access the channel-measurement block, only the channel-measurement facility associated with the OS for which the condition occurred is stopped.
7. If an error condition is detected for one or more of the channels that requires the associated timers (used to calculate the channel-busy time or channel time-stamp) to be initialized by the channel subsystem in order to recover the channel, only the channel measurement facility associated with the OS for which the condition occurred is stopped.
8. Depending on the type of hypervisor, if a system reset is performed as part of an automated or manually initiated recovery function for the CEC, all channel-measurement facilities for all OSs are stopped.

In this manner, the invention enables selective measurements by any OS in a CEC in the use of I/O resources (whether shared or unshared) available to programs running under the OS.

Command-Request Block (CRQB) for OS

FIG. 3A shows a "command request block" (CRQB) which is an operand of the "set channel measurements" instruction and which designates the type of command being executed by the instruction. A CRQB is located in the MS assigned to the respective OS in the CEC. The partition-assigned MS of an OS includes all of the real storage addressable by that OS and by all of the programs running under that OS. An OS (and its programs) cannot address any other MS (assigned to any other OS in the CEC).

An OS (or one of its programs) constructs a CRQB and provides it as part of the set channel measurement instruction to the CEC's I/O channel subsystem to have it asynchronously measure the utilization of I/O resources (such as channels) used by the respective OS. The fields within the CRQB shown in FIG. 3A are as follows:

L1: Specifies the length for the command-request-block, such as 32 bytes.

Command Code (CC): Specifies values representing the type of channel-measurement facility operation that is to be performed. The meaning of each value is as follows:

0 Start the channel-measurement facility.

In hypervisor mode, the channel-measurement facility is started only for the OS specified in the OS image ID field (channel-measurement facilities for other OS images are not affected when the OS selection IID field is zero.) All of the defined fields in the CRQB are used in performing the start operation. When the specified channel measurement facility is already active, the specified channel-measurement facility remains active and normal instruction completion is indicated in the response block. In the latter case, the command-request block's specified relocation zone, storage access key, and channel measurement block address values will be used for all subsequent measurement block updates for the specified OS unless an error condition is detected by the channel subsystem for any of the specified values in which case the measurement facility remains active and continues to use the previously specified values; that is, the values that were in effect prior to the execution of the second start command.

In non-hypervisor mode, no OS image number need be specified (since only one OS is involved).

1 Stop the channel-measurement facility.

In hypervisor mode, both the command code field and the image identification field are used in performing the stop operation. The channel-measurement facility for the specified OS is stopped and no further access is made to the corresponding channel-measurement block. Other channel-measurement facilities for other OSs are not affected. When the stop command is specified and the specified channel measurement facility is not active, the specified channel-measurement facility remains stopped and normal command completion is indicated in the response block.

In non-hypervisor mode, only the command code field is used in performing the stop operation, and no OS need be specified (since only one OS is involved).

2 Test the status of the channel-measurement facility.

The status of the channel-measurement facility for the specified OS is returned to the requesting program in the command-response block. In hypervisor mode, the command code field and the CPC-image identification field are used in performing the test operation.

In non-hypervisor mode, only the operation code field is used in performing the test operation.

OS Image ID: In hypervisor mode, this field contains the partition's IID (image identifier) code that identifies the OS for which channel measurements are to be started, stopped, or tested. NOTE: In a CEC using a hypervisor, it is preferable to have the hypervisor provide the OS IMAGE ID value when it is required, since for security and transparency reasons it is desirable for OSs not to have access to their OS IMAGE ID values or to be concerned that a hypervisor is controlling the CEC. Then the OS program specifies all zeros in this field. All zeros are also provided in this field when the CEC is operating in the non-hypervisor mode with a single OS.

Relocation Zone: The relocation zone number is used for accessing the required one of the plurality of OS MSs containing the OS control blocks used by the channel-measurement facilities provided in the CEC's channel subsystem. No relocation zone number is used when the CEC is not operating with a hypervisor.

NOTE: In a CEC using a hypervisor, it is preferable to have the hypervisor provide the zone relocation number when it is required, since for security and transparency reasons it is desirable for OSs not to have access to this value or to be concerned that a hypervisor is controlling the CEC. Then the OS program specifies all zeros in this field. All zeros are also provided in this field when the CEC is operating in the non-hypervisor mode (with a single OS).

Key: Contains a storage-access key required to access the channel-measurement block in OS main storage.

Channel-Measurement-Block Address

Contains the address of the channel-measurement-block area in main storage for the requesting OS. The specified address is relative to the origin of the associated relocation zone as specified by the relocation-zone field in this CRQB. When the CEC is not being controlled by a hypervisor, the address is an absolute main storage address. When the operation code specifies a stop or test operation, this field is ignored.

Command-Response Block (CRPB) for OS

FIG. 3B shows a "command-response block" (CRPB), which like the CRQB, is located in any one or more of MS-1 through MS-N assigned to the respective OSs in the CEC. An OS (or one of its programs) provides the space for, the CRPB directly following the CRQB in preparation for issuing a set channel measurements instruction to the CEC's channel subsystem. The channel subsystem inserts values into the CRPB indicating how the requested operation completed. The fields within the CRQB shown in FIG. 3B are as follows:

L2: Specifies a command-response-block length such as eight bytes.

Response Code: Receives a response code from the channel subsystem indicating the result of the request to execute the Set-Channel-Measurements instruction. Valid response codes are 0001, 0003, 0004, 0102, 0103, and 0104 hex.

Status: In hypervisor mode, the status of the channel-measurement facility for the specified OS is provided by the channel subsystem. In non-hypervisor mode, the status of the single channel-measurement facility is provided by the channel subsystem. The meaning of each status value is as follows:

0 The channel-measurement facility is active.

1 The channel-measurement facility is in the stopped state. The channel-measurement facility has not been started or was stopped by the execution of the stop operation (OC=1 in the requesting CRQB).

2 The channel-measurement facility encountered a program check when attempting to update the channel measurement block and is in the stopped state. The channel-measurement-block address is invalid. The channel-measurement block address is invalid when it is not within the limits of the specified zone or is in a location of storage that is not in the configured state.

3 The channel-measurement facility encountered a protection check when attempting to update the channel-measurement block and is in the stopped state. The storage-access key specified in the command-request block does not match the storage-access key of the channel-measurement block.

4 The channel-measurement facility encountered an uncorrected storage or a storage-key error when attempting to update the channel-measurement block and is in the stopped state.

5 The channel-measurement facility encountered an error and is in the stopped state. The condition causing the error has been recovered. The facility may be immediately restarted by executing the Set Channel-Measurements command and specifying the start operation code.

6 The channel-measurement facility encountered an error and is in the stopped state. The condition causing the error has been recovered; however, the channel-measurement facility should not be restarted until some later predetermined amount of time. For example, the CMF should not be restarted until the channel processor measurements clocks are reinitialized and again usable for measuring busy time.

7 The channel-measurement facility encountered an error and is in the check-stop state. The condition causing the error can not be recovered by the channel subsystem. External intervention is required before the facility can be restarted.

The same status value is indicated in the CRPB by repeated execution of the test operation until the state of the channel measurement facility is changed by a start operation, a stop operation, a I/O-system reset function is executed, a OS image reset function is executed, or an error condition is recognized that affects the specified channel-measurement facility.

When the operation code in the requesting CRQB specifies a start or stop operation, the status field is zero.

Channel-measurement Block (CMB) for OS

FIG. 4 shows a "channel-measurement block" (CMB) which, like the CRQB and CRPB, is located in any one or more of MS-1 through MS-N assigned to the respective OSs in the CEC.

Each OS has a program which provides the location of, and space for, the CMB (as well as for the CRQB and CRPB) in preparation for issuing a "set channel-measurements" SCM instruction to the CEC's I/O channel subsystem, which is executed by a CPU dispatched to perform an OS task.

In this preferred embodiment, the I/O resource measurements are made periodically and asynchronously by each provided channel processor which does the time measurements for each channel and channel image. After the time measurements are posted into measurement sets within a control block the HSA, the time measurements in the HSA control block are thereafter periodically copied by an IOP to control blocks in the each OSs MS in the each OS's assigned partition in the CEC.

A "sample count" field in the CMB in FIG. 5 is used in common to all measurement sets in the CMB. The sample count field operates as follows:

Sample Count: Incremented once each time this CMB is up-dated by the channel subsystem.

Each measurement set in the CMB is a set of fields for each channel in the CEC, which is assumed in this example to have 256 Shareable channels. These channel sets are numbered from 0 to 255. Each channel set contains a "S" field, a "busy time" field, a "V" field, and a "time stamp" field for one channel while the channel is being used by the associated OS. Each of the other N number of OSs in the CEC may also have a similar CMB for the same channels in their respective MSs.

The fields within a respective channel set in a CMB are operable only while the associated channel is configured online to the respective OS. The fields within each channel set in the CMB operate as follows:

V: "Valid" field. When V=1, the associated channel is configured to the requesting OS and busy time will be accumulated and periodically stored into the channel-busy time field. While V=1, the associated "channel time-stamp" field is also valid.

When V=0, the associated channel is not configured to the requesting OS, and the content of the associated channel-busy time field and time stamp field are not meaningful. The V bit is stored as zero when any of the following conditions exist:

1. The associated channel is not provided by the CPC.
2. The associated channel does not provide channel-busy measurements.
3. The associated channel is in the permanent error state.

Channel-Busy Time (CBT): Contains the accumulation of measured channel-busy intervals for each associated channel. The channel is busy when it is actively communicating with an attached control unit or device. When the associated channel is not shared, CBT is the sum of all intervals of channel busy. When the associated channel is shared by one or more other OSs, the CBT field contains the sum of the channel intervals for only the OS associated with the requesting channel-measurement block. Busy intervals for other OSs that share the channel are not included in the accumulation. (The time intervals are measured at the channel using a resolution that is appropriate for the channel type.) Each channel records its channel-busy time independently of other channels or channel images.

S: Shareable Channel indicator field. The S bit is meaningful only when the V bit is one (entry is valid). When S=0 and V=1, the associated channel is configured to the subject OS and is not shareable by any other OS. When S=1 and V=1, the associated channel is configured to the subject OS and may be shared by one or more other OSs.

Channel Time-stamp (CTS): Contains a time-stamp value that identifies when the most recent channel-busy time for the associated channel was recorded by the Channel Subsystem. Each time-stamp applies only to the associated channel-busy time in the same channel measurement set.

All fields in the channel-measurement block are not meaningful until the measurement block has been asynchronously updated at least once by the channel subsystem.

CPU-IOP Communication Block (CICB) in HSA

FIG. 5 shows a "CPU-IOP communication block" (CICB) which is constructed by hardware/microcode in the CEC's HSA (hardware system area), which is not addressable by the OS program that constructed the CRQB and CRPB.

The fields in the CICB are filled from corresponding fields in the CRQB or from the SIE state description when the SCM instruction is interpretively executed except for the status and response code fields which are filled by the microcode when it fills the same labeled fields in the CRPB.

IOP Status Block (IOPSB) in HSA

FIG. 6 shows the format of an "IOP Status block" (IOPSB) located in the HSA. The IOPSB has an entry for each of the channel-measurement facilities (CMFs) in the CEC. A CMF may be provided for the hypervisor and for each of the N number of OSs in a CEC operating in hypervisor mode.

Each of the IOPSB entries has a "status" field and a "channel measurement block address" field. The status field may have any of the following status codes:

0 = The CMF is active for this OS.
1 = The CMF is stopped for this OS.
2 = The CMF is stopped for this OS due to a program check condition.
3 = The CMF is stopped for this OS due to a protection check condition.
4 = The CMF is stopped for this OS due to a storage or storage key error.
5 = The CMF is stopped for this OS due to a CMF error. It may be restarted immediately by the program.
6 = The CMF is stopped for this OS due to a CMF error. The program must wait a CEC prescribed amount of time before restarting it. For example, 16 seconds.
7 = The CMF is in the check stopped state for this OS.

Channel-Processor Clock Register (CPCR), Channel-Processor Starting Time Register (CPSTR), and Channel-Processor Ending Time Register (CPETR) In Channel-Processor Local Storage FIG. 7A shows the registers in the local storage of each of the channel processor in the CEC. One set of these 3 registers are provided for each physical channel controlled by each channel processor. These registers are used by each channel processor to continually measure the busy intervals for each OS that shares the channel.

Channel Processor Measurement Block (CHMB) In Channel-Processor Local Storage FIG. 7B a shows a channel-processor measurement block (CHMB) in the local storage of each of the channel processors in the CEC.

One CHMB is provided for each physical channel in the CEC. Each CHMB has N measurement sets, one measurement set for each OS currently configured in the CEC. Each measurement set in the CHMB accumulates information for one channel image (i.e. use of the physical channel by one OS). The fields in a measurement set in the CHMB are defined the same as the corresponding fields in the measurement sets in the CMB.

Each channel processor is continuously measuring the busy time for its channel by updating and storing its channel's accumulated busy time for each OS in their respective measurement sets in the CHMB in the processor's internal storage (its local storage). This invention continuously measures and accumulates busy time for each OSs channel image.

The continuous measurement and accumulation of busy time for each OS channel image is not affected by periodic transfers of the accumulated times to HSA, and the periodic transfers do not cause any statistical,, sampling effect (as is explained in relation to FIG. 14).

Channel-Images Measurement Information Block (CIMB) In HSA

Figure 8:
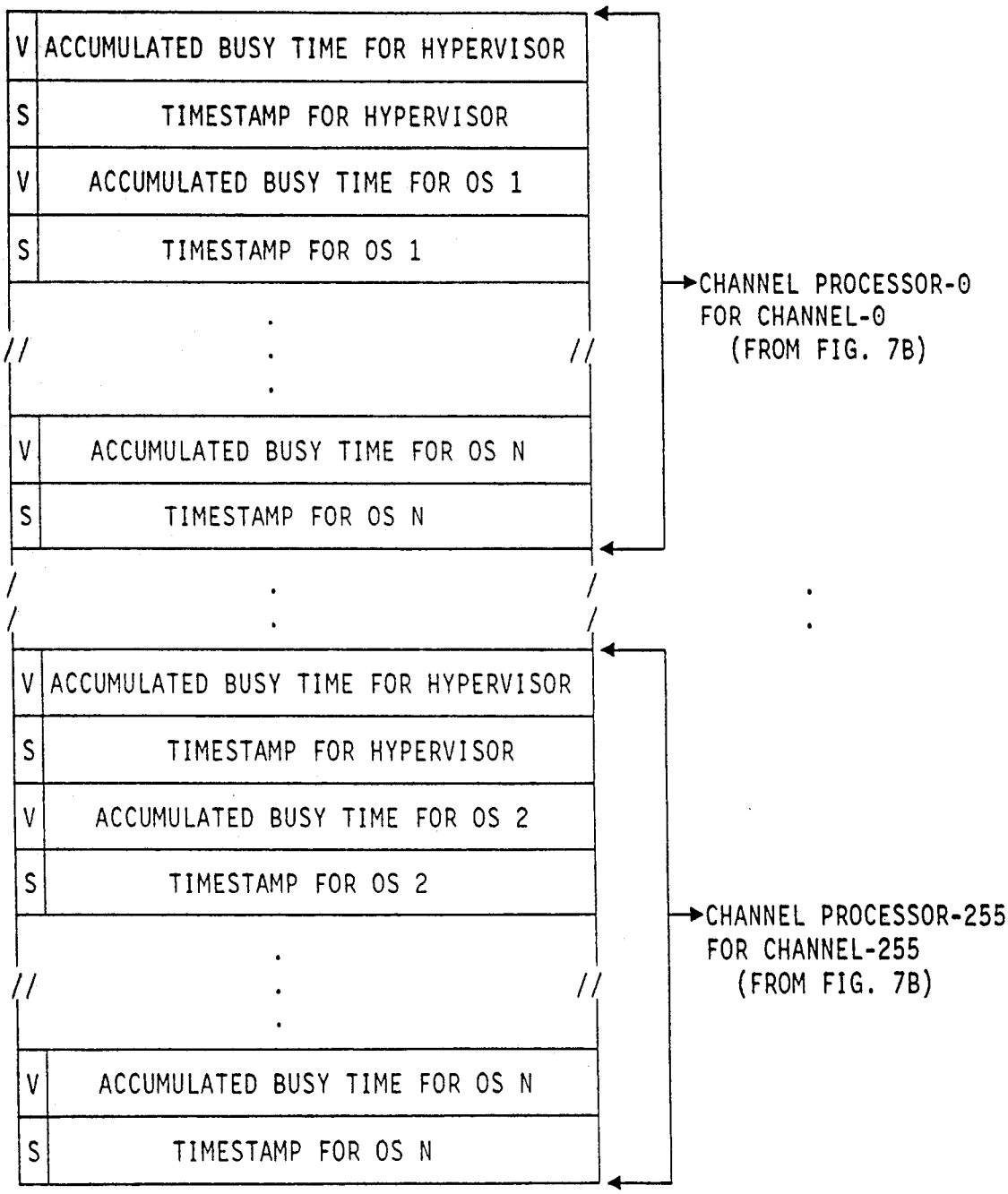
FIG. 8 shows a Channel-Images Measurement Block (CIMB).

FIG. 8 shows a channel-images-measurements block (CIMB). One CIMB is provided in the HSA for all channel images that may be provided by the CEC. The CIMB has a channel processor entry for every possible channel processor in the CEC, for example 256 channel processors. Each channel processor entry has N measurement sets, one measurement set for each OS image configured in the CEC. Each measurement set has the same fields as a measurement set in the channel-processor measurement block (CHMB) in FIG. 7B.

Periodically (for example, every 2 seconds), the contents of all of the CHMBs (up to 256) are transferred from all of the respective channel processor local storages into corresponding entries provided in the CIMB for all channel processors. That is, each entry in the CIMB is copied from a respective CHMB in one of the plurality of channel processors.

The CIMB is only accessible to CEC microcode and is not addressable by the OSs. Therefore, the contents of the CIMB is periodically transferred (for example, every 4 seconds) into the channel measurements control blocks (CMB) in the OS storage to make this information accessible to the OSs, which is done in the preferred embodiment.

Normal Command Completion

When the CEC is operating in hypervisor mode, a response code of 0001 indicates normal completion of an SCM instruction, which is provided by a channel-measurement facility to the specified OS after performing the CMF requested operation (the CMF has been started, stopped, or tested as determined by the operation code and the IID specified in the command-request block for the SCM instruction).

When the CEC is operating in non-hypervisor mode, a response code of 0001 indicates that the channel-measurement facility is operating only for one OS in the CEC, which has been started, stopped, or tested as determined by the operation code specified in the command-request block. In the hypervisor mode, a response code of 0001 is provided only to the requesting OS indicated by the OS image ID field in the command-request block of the SCM instruction executed by that respective OS. In the hypervisor mode, any physical channel may be shared by multiple OSs in the CEC, and only its use of the physical channel by that respective OS is reported to the OS. However in hypervisor mode, any physical channel need not be shared by multiple OSs in the CEC, in which case the physical channel is exclusively used by one OS, and then the measurement facility reports the entire use of the physical channel to the OS.

Special Conditions

A special condition exists if a response code other than 0001 hex is stored in the command-response block of the channel response block (CRPB) in FIG. 3B. A response code other than 0001 indicates to the OS executing the Set Channel-Measurements instruction that the execution of the instruction has been suppressed. Then, the specified channel-measurement facility is left in the state that existed prior to the execution of the SCM instruction. The special condition indication codes put into the CRPB for the SCM instruction are as follows:

'0003': Response code 0003 hex is stored in the CRPB for the following reasons:
1. The L1 field in the CRQB contains a value other than the predetermined number of bytes, for example 32.
2. Fields in the CRQB, which are supposed to be zeros, are not all zeros.
3. The CEC is not under control of a hypervisor and the OS image ID in the CRQB is not zero.
4. The start operation is being executed under a hypervisor SIE instruction and the general conditions for interpretive execution are met but the relocation zone field in the CRQB is not zero.
5. The start, stop, or test operation is executed under a hypervisor SIE instruction and the general conditions for interpretive execution are met but the IID field of the CRQB is not zero.
6. The operation code field in the CRQB is invalid.

'0004': Response code 0004 hex is stored in the CRPB if the SCM instruction is not provided.

'0102': Response code 0102 hex is stored in the CRPB for the following reasons:
1. A start operation was specified, the relocation zone field is not zero but the specified zone is not provided in the CEC.
2. A start operation was specified but the specified channel measurement block address is invalid. The measurement block address is invalid when any of the following conditions are recognized:
   The address does not specify a proper location such as on a 4K-byte boundary.
   The address specifies a location that is not within the limits of the specified zone.
   The address specifies a location that is not configured.
   The address specifies a location that is not provided by the model.

'0103': Response code 0103 hex is stored in the CRPB for the following reason:
1. The specified storage-access key does not match the storage-access key of the specified channel-measurement-block area. When the specified storage-access key in the CRQB is zero, the key of the channel measurement block is not tested for a matching value.

'0104': Response code 0104 hex is stored in the CRPB for the following reasons:
1. The CPC is operating in hypervisor mode but the specified OS image is not provided by the model or the current I/O configuration.

Detailed Operation of SCM Instruction

Figure 9:
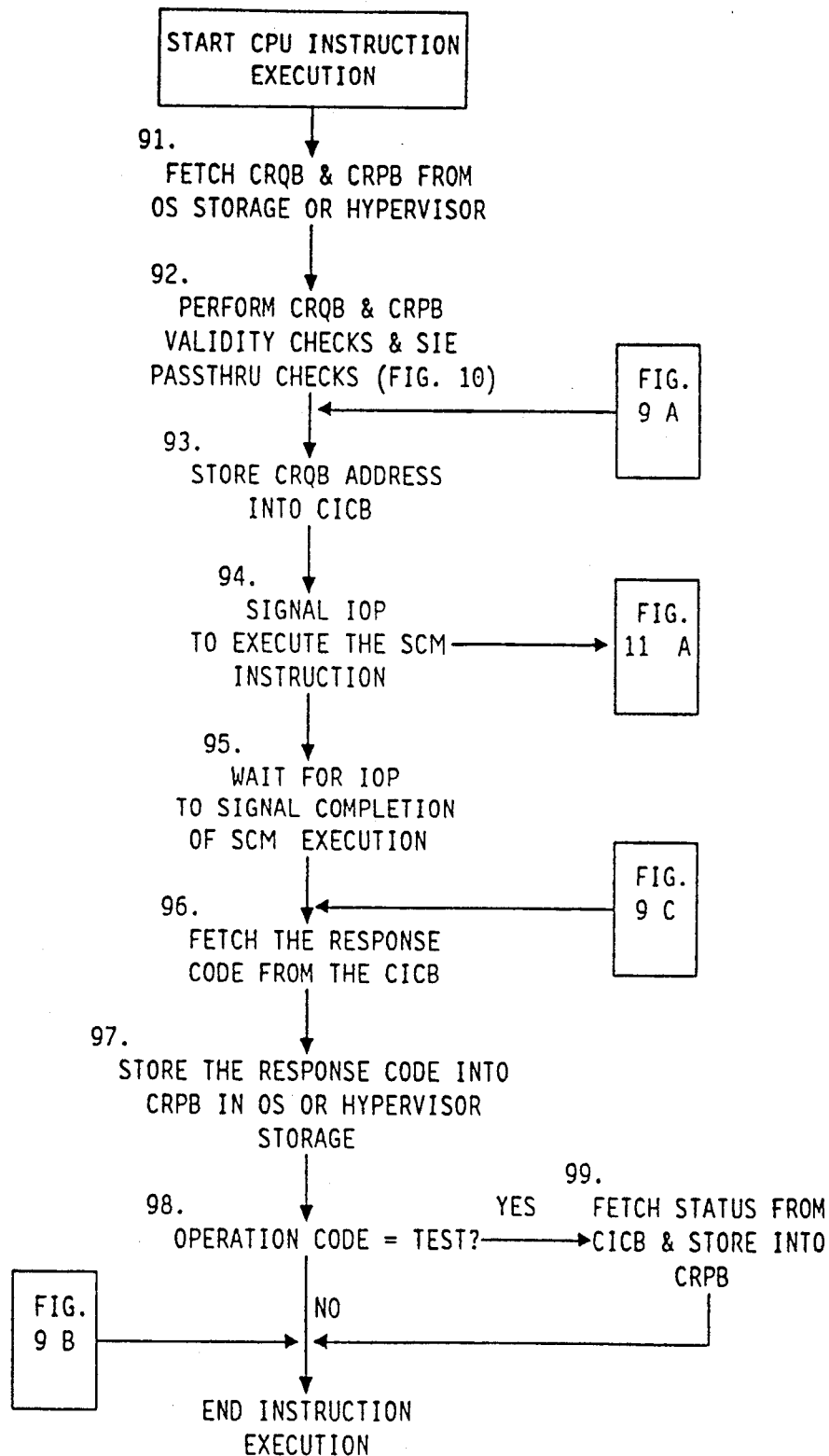
FIGS. 9-13 are a flow diagram showing a sequence of steps providing operations for the "set channel-measurements" (SCM) instruction.

FIG. 9 is a flow diagram showing the sequence of steps required for a CPU to execute the "set channel measurements" (SCM) instruction. It starts with step 91, in which the CPU executing the instruction fetches the command request block (CRQB) and the command response block (CRPB) addressed by the instruction operand. The CRQB contains the address of the OS channel measurements block (CMB), which is an implied third operand of this instruction. Previously inserted information in the CRQB includes the CRQB length, the operation code, the OS image ID assigned to the partition of the OS, the relocation zone number assigned to the partition of the OS, a storage protect key to be used by the channel subsystem to access the CMB, and the CMB address.

Preferably, the OS image ID and the zone relocation number are not pre-inserted into the CRQB by the OS, but are provided by the microcode when the SCM instruction is interpretively executed or is inserted into the CRQB by the hypervisor when the SCM instruction is intercepted and reissued by the hypervisor on behalf of the OS. In the preferred embodiment, the OS is not aware of its assigned OS image ID or its relocation zone number, which are solely handled by the microcode and by the hypervisor.

In step 92, the CPU performs SCM interpretive execution checks and validity checks on the control blocks provided by the operands of the SCM instruction. The process of step 92 is exploded in FIG. 10, which performs these steps for determining if the CPU is executing is SCM SIE interpretive execution mode and the various validity checks that have been previously described herein.

In step 93, the CPU stores the CRQB address into a control block accessible only to the CEC hardware/microcode. It is the CPU-IOP communication block (CICB) shown in FIG. 5 which is located in a portion of the CEC memory (herein called a "hardware system area", HSA) which is accessible to the CEC microcode, but is not accessible to any OS except in a limited way through special instructions provided only for particular types of accesses.

Figure 11:
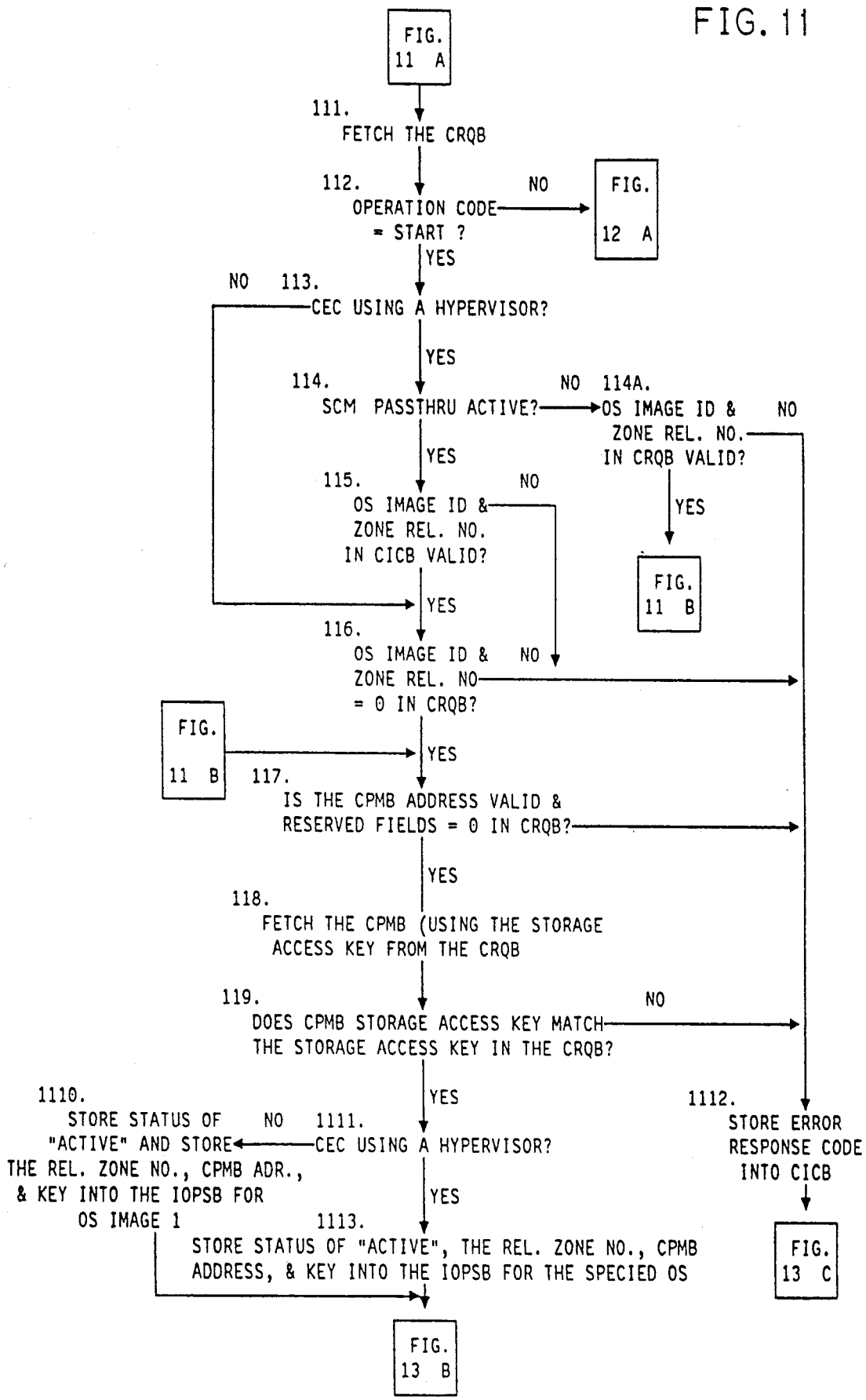

In step 94, the CPU signals an input/output processor (IOP) in the CEC to continue the execution of this SCM instruction, which is shown in FIG. 11. This shifts the burden of performing the SCM start, stop, and test operations from the CPU to the I/O channel subsystem. Then, step 95 represents the CPU waiting until the IOP completes the SCM instruction process.

When the IOP completes the SCM instruction process, the CPU enters step 96 in FIG. 9 which ends the CPU wait represented by step 95. The advantage of having the IOP perform this part of the execution is to be able to put the SCM instruction microcode in the I/O channel subsystem, rather than in the CPU where microcode requirements are much more stringent.

In step 96, the CPU fetches the response code from the CPU-IOP communications block (CICB) generated during the IOP SCM instruction processing. And in step 97, the CPU stores the response code into the command response block (CRPB) in the requesting OS's MS. Step 97 occurs near the end of execution of the SCM instruction. The response code indicates to the OS program whether the SCM instruction execution was successful or not, and if not, why it was unsuccessful. These codes may have any of the values previously described herein.

In step 97 the CPU inspects the operation code to determine if the test operation was executed and if it was, step 99 is executed to fetch the CMF status from the CICB and store it into the command response block to indicate the status of the CMF to the OS program.

Figure 12:
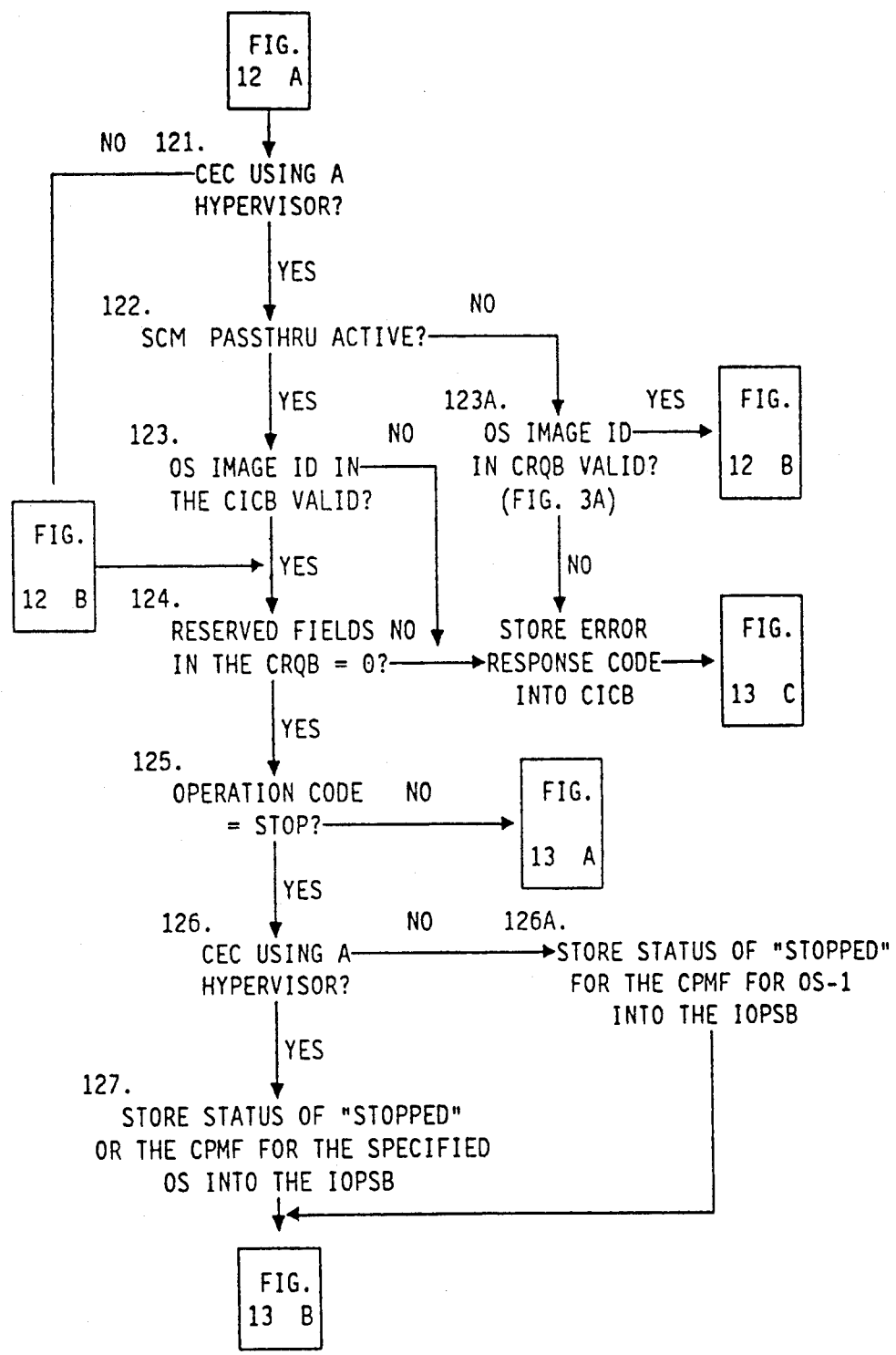
Figure 13:
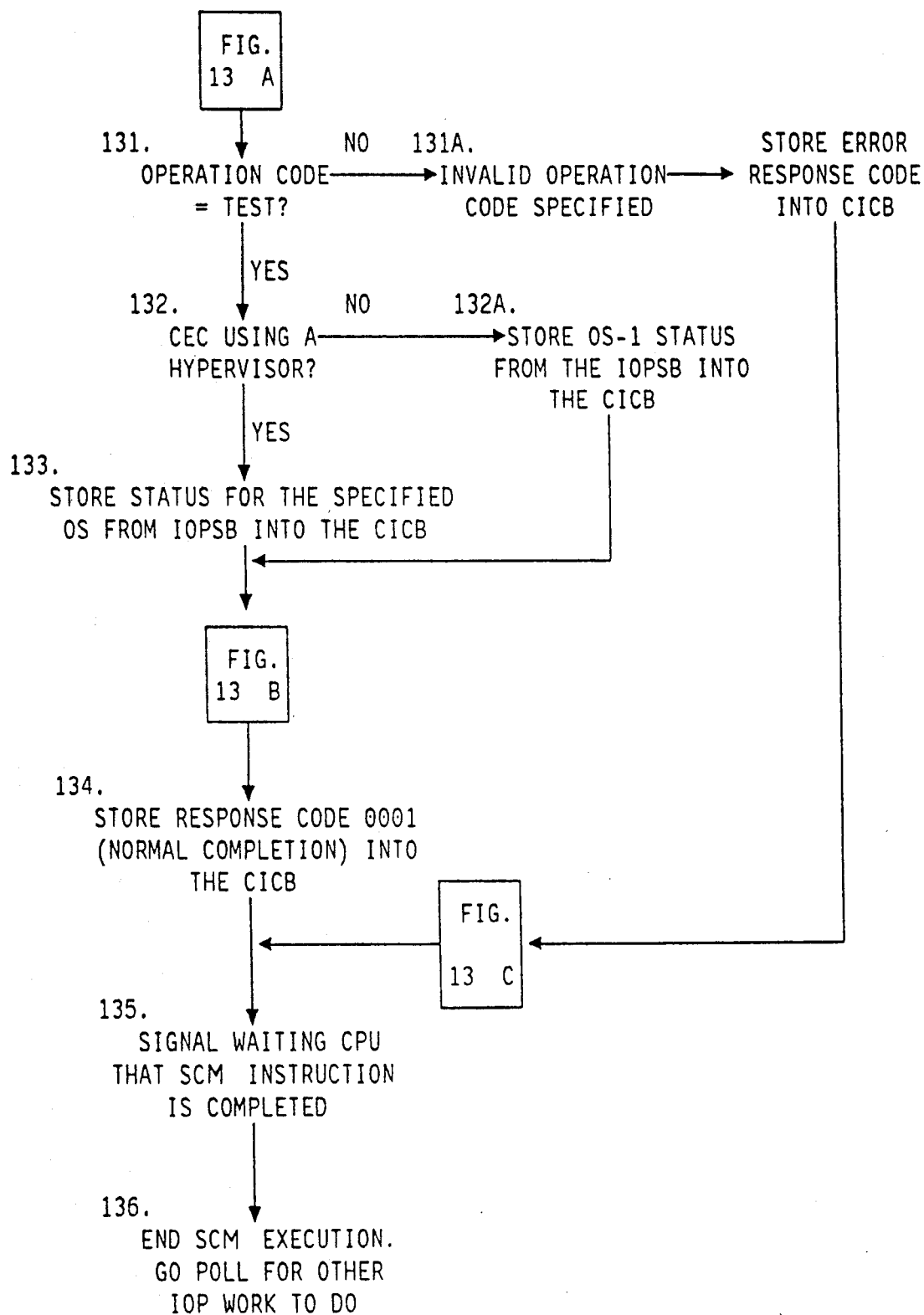

FIGS. 11 through 13 represent the channel subsystem process for executing the start, stop, or test operations as part of the execution of the SCM instruction. It starts with step 111 which fetches the CRQB from OS storage, which contains the CRQB length, the operation code, the OS image ID and the relocation zone number of the executing OS, the storage access key of the channel measurement block, and the address of the channel measurement block.

Figure 10:
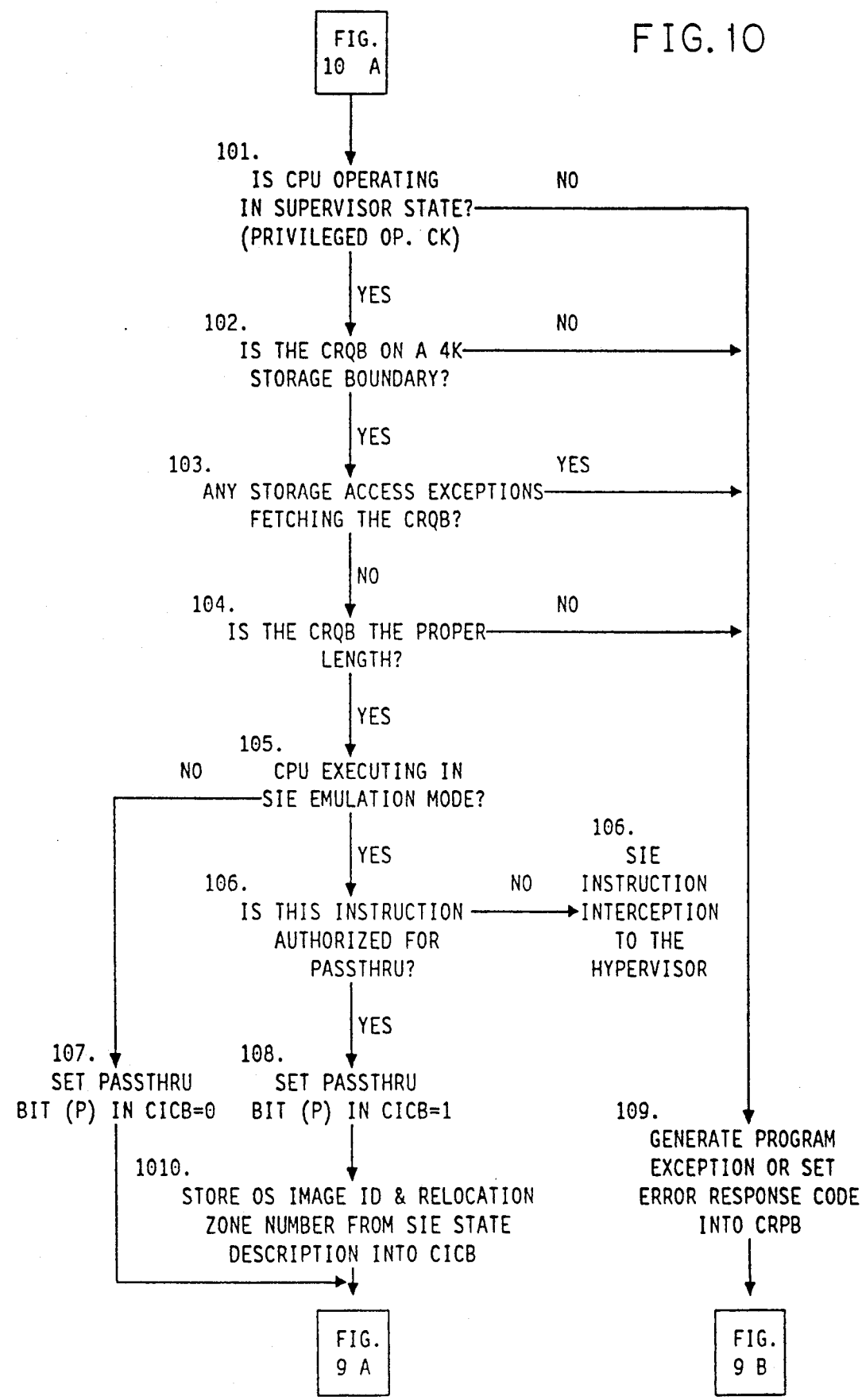

Note: The CRQB only contains the OS image ID and the relocation zone number when the SCM instruction is executed by the hypervisor. When the SCP instruction is interpretively executed by an OS, both of these values are passed to the IOP by the CPU SCM instruction microcode in the CICB in HSA. When the OS program interpretively executes the SCM instruction, both the OS image ID and the relocation zone number fields in the CRQB must be set to zeros by the OS program prior to it executing the SCM instruction just as when the CEC is not under control of a hypervisor. The CPU microcode copies the OS image ID and the relocation zone number from the active SIE state description into the CICB as shown in FIG. 10, step 1010 as the means for providing these values to the IOP.

Step 112 tests the operation code in the CRQB to determine if a start operation is specified. If the operation is not a start, the process continues at FIG. 12. If the start operation is specified, the IOP tests the mode of CEC operation to determine if a hypervisor is controlling the CEC (step 113). If there is no hypervisor controlling the CEC, the process continues at step 116.

If a hypervisor is controlling the CEC (step 113 yes path), the IOP tests to determine if the SCM instruction is being interpretively executed in passthru mode (step 114). Step 114 tests the SCM passthru bit, set by the CPU SCM microcode in the CICB, to determine if the SCM instruction is being interpretively executed under SIE control. If it is, the OS image ID and the relocation zone number passed by the CPU in the CICB are checked to determine if they specify values that are provided by the CEC (step 115). If these values are valid, processing continues at step 116. If these values in the CICB are not valid, an appropriate error response code (previously described herein) is stored into the command response code in the CICB in the HSA (step 1112) and the waiting CPU is signaled that the IOP is completed executing the SCM instruction (FIG. 13, step 135). The IOP then proceeds to look for other work tasks to perform (FIG. 13, step 136) such as executing I/O requests for previously queued Start Subchannel requests. If the CEC is not being controlled by a hypervisor (step 114 test) these checks are not made and the process continues at step 116.

If a hypervisor is controlling the CEC but the SCM instruction is not being interpretively executed in passthru mode (the step 114 no path), the step 114A test is made by the IOP in order to determine if the hypervisor specified OS image ID and relocation zone number in their respective fields in the CRQB are valid. If these values are valid, the process continues at step 117. If these values are not correctly specified by the hypervisor, an appropriate error response code is stored into the command response code in the CICB in the HSA (step 1112) and the CPU is signaled as described above that SCM execution, at the IOP, is ended.

Step 116 tests to determine if the OS image ID and zone relocation number values in the CRQB are correctly specified as zero when either no hypervisor is controlling the CEC or the SCM instruction is being interpretively executed. If the OS correctly specified zero values, the process continues at step 117. If either of these values is not zero, an appropriate error code is stored in the command response code in the CICB in the HSA (step 1112) and the CPU is signaled as described above the SCM execution, at the IOP, is ended.

Step 117 checks to determine if the CMB address specified by the OS is valid and whether all of the reserved fields in the CRQB are properly specified with zero values. When any of these checks fail, an appropriate error code is stored in the command response code in the CICB in the HSA (STEP 1112) and the CPU is signaled as described above that SCM execution, at the IOP, is ended. When all of these checks are successful, processing continues at step 118.

Steps 118 and 119 test to determine if the storage access key specified by the OS matches the actual storage access key of the CMB in the OSs main storage. The IOP uses the specified key from the CRQB and issues a fetch request to the storage address of the CMB and then tests the results of the fetch operation. If the fetch was successful, the keys match and processing continues at step 1111. If the fetch is unsuccessful, an appropriate error code is stored in the command response code in the CICB (step 1112) and the CPU is signaled as described above that SCM execution, at the IOP, is ended. Note: if the key value in the CRQB is zero, this test is not made as a zero key will allow the IOP to both fetch and store the CMB subsequently when the channel measurement information is periodically stored into the CMB by the IOP regardless of the actual key value of the CMB in storage.

Step 1111 tests to determine if the CEC is executing under control of a hypervisor. If it isn't, only one OS is operating in the CEC and the IOP stores an "active" indication into the IOPSB entry in HSA for OS image 1, the storage access key value from the CRQB, and the CMB address from the CRQB into the IOPSB entry for OS image 1. If a hypervisor is controlling the CEC, multiple OSs may be configured and the IOP stores the "active" indication, the storage access key value, and the CMB address into the IOPSB entry for the specified OS image. The status, key, and the CMB address in the IOPSB will be subsequently used by the IOP when it periodically updates each active channel measurement facilities CMB for each respective OS. Upon completion of updating the IOPSB, the process continues at FIG. 13, STEP 134 where the IOP stores the normal completion response code into the CICB (FIG. 13, step 134) and signals the waiting CPU as described above that the SCM instruction is completed at the IOP.

FIG. 12 shows the IOP process for making the necessary hypervisor mode checks, SCM interpretive execution checks, and the appropriate reserved field checks that are necessary for either a "stop" or "test" operation and that are similar to the checks made by the IOP for a "start" operation as previously shown in FIG. 11. Upon successful completion of these checks (in steps 122, 123, 123A, and 124), the operation code field in the CRQB is checked for a "stop" operation (step 125). If the operation code does not specify a "stop" operation, processing continues at FIG. 13. If the operation code is found to be a "stop" operation, the IOP checks to determine if the CEC is operating under control of a hypervisor. If not, only one OS is executing in the CEC and the CMF status for OS image 1 is set to the "stopped" state in the IOPSB entry in HSA for OS-1 (step 126A). If the CEC is operating under control of a hypervisor, multiple OSs may be executing and the CMF status in the IOPSB entry in HSA for the specified OS image is set to the "stopped" state (step 127). The process then continues at step 134 of FIG. 13 in order to store a normal completion code into the command response code in the CICB and to signal the waiting CPU that the SCM instruction is completed at the IOP.

FIG. 13 shows the IOP process for the "test" operation. If in FIG. 13 a "test operation" code is found in the operation code field in the CRQB, the yes path is taken from step 131 to step 132. If a "test" operation is not found in the operation code field, an invalid SCP operation code is contained in the CRQB and the IOP stores an appropriate error response code into the CICB (step 131B) and signals the waiting CPU as described above the SCM instruction is completed at the IOP.

Step 132 tests if the CEC is using a hypervisor and if it is (the yes path to step 133) copies the channel measurement facility status for the OS image from the associated IOPSB OS entry into the CICB. The process then continues at step 134.

If no hypervisor is found to be used by step 132, step 132A is entered to copy whatever status indication exists in the OS-1 entry in the IOPSB and the process then continues at STEP 134.

Step 134 stores a normal completion response code into the CICB for the CPU microcode and then signals the waiting CPU (step 135) that the SCM instruction is completed execution at the IOP. The IOP then polls for other work tasks to perform.

Figure 15:
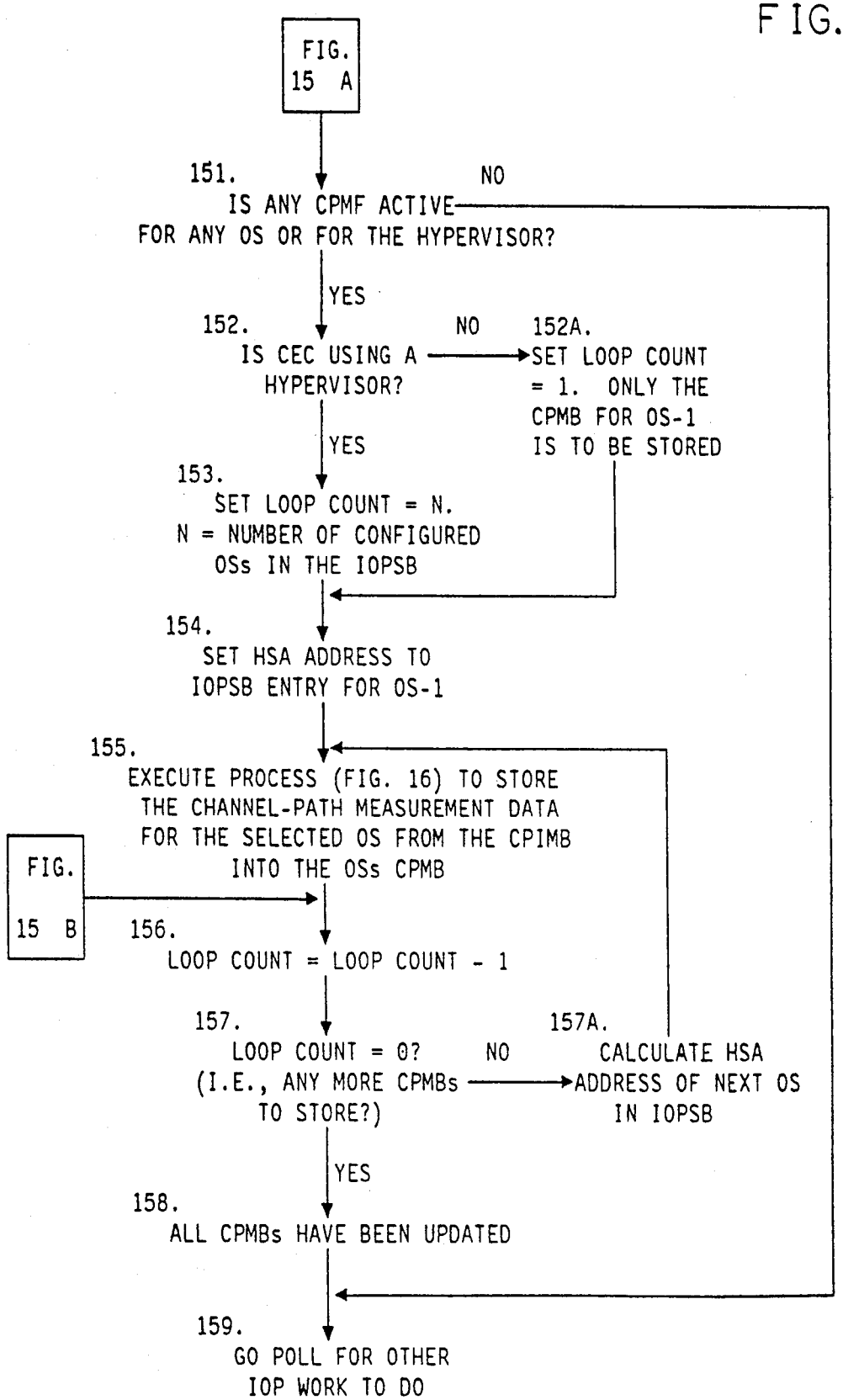
FIGS. 15 and 16 are a flow diagram showing steps done by an I/O processor for moving data in a channel-measurement block from the HSA to an OS's partitioned main storage.
Figure 16:
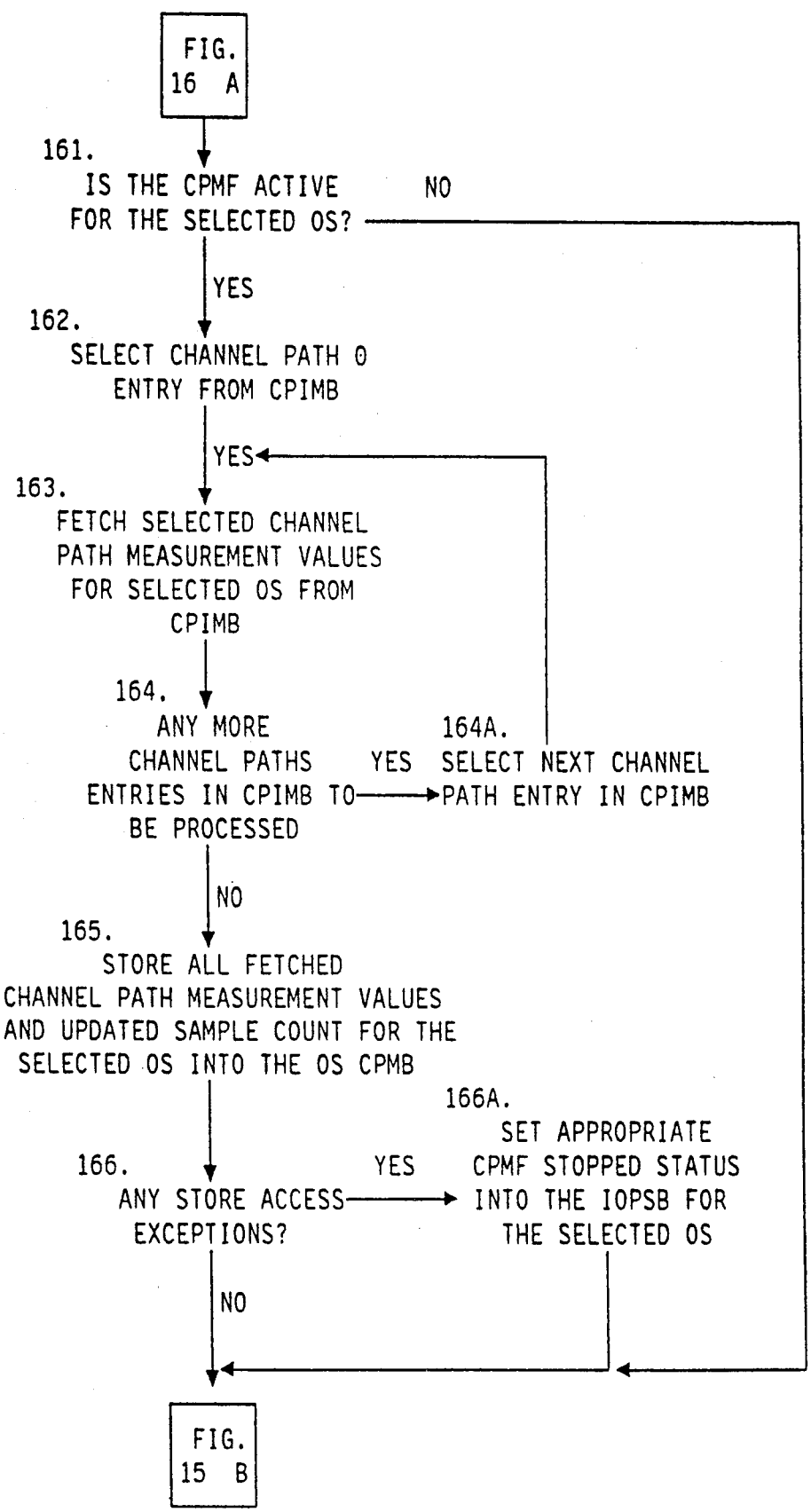

FIGS. 15 and 16 show timer-driven routines for periodically updating the OS channel measurement blocks (CMB) in the MSs of the respective OSs which have active channel measurement facilities (CMFs). For example, a IOP timer interruption may occur every 4 seconds to cause an entry to step 151. Then, the IOP executes the process in FIG. 15, in which step 151 checks the IOP status block (IOPSB in FIG. 6) for the status of all CMFs. Step 151 checks if the IOPSB indicates any CMF is active. If no CMF is active step 159 is entered and the IOP is released to do other work.

Step 152 tests if the CEC is using a hypervisor. If a hypervisor is not being used, step 152A is entered to set a loop count of 1. If a hypervisor is being used, step 153 is entered to set a loop count of N (which is the number of OSs configured in the CEC). Then, step 154 accesses the IOP status block (IOPSB) and accesses the first status entry for OS-1. Then the process in FIG. 16 is executed, which scans through the respective channel processor entries (0-255) in the channel image measurement block (CIMB, see FIG. 8) to access the two-word set for the currently specified OS (which initially is OS-1); then that set is written into a corresponding two-word set for that channel located in the channel measurement block (CMB) for that OS in its MS (see FIG. 4).

Step 156 is next entered to decrement the loop count by 1, and step 157 tests the resulting count to determine if it has reached zero. If zero is reached, all two-word sets have been copied into the CMBs for all OSs in the system (indicated in step 158), and in step 159 the IOP is released to do other work.

FIG. 16 shows the detail of step 155 in FIG. 15. If no CMF is active, the process exits at point B in FIG. 15.

If any CMF is active, the process continues with step 162, which selects the first entry in the CIMB (FIG. 8) for channel 0, and goes to step 163.

Step 163 fetches the two word set containing the channel measurement values for the selected OS, and step 164 is entered.

Step 164 checks to determine if any more next channel entries are to be processed in the CIMB. If yes, the process goes back to step 163 for processing the next entry. If no, step 165 is entered to store all fetched two-word sets into the CMB for the respective MS for the OS. Step 166 checks for any exceptions, and if none exist an exit is taken to point B in FIG. 15 (which goes to step 156 in FIG. 15). If any exceptions exist, step 166A is entered to set the "stopped" status in the IOPSB for the CMF of the appropriate OS. This stops the CMF for the associated OS and keeps the IOP from continually encountering the same exception condition each time the IOP periodically updates the CMB for the active channel measurement facilities.

Many variations and modifications are shown which do not depart from the scope and spirit of the invention and will now become apparent to those of skill in the art. Thus, it should be understood that the above described embodiments have been provided by way of example rather than as a limitation.

Having thus described our invention, what we claim as new and desire to secure by Letters Patent is:

1. A means for measuring channel use time, comprising:

a computer electronic complex (CEC) having an I/O channel subsystem supporting I/O channels shareable by a plurality of operating systems (OSs) associated with different resource partitions in the CEC including a plurality of CPUs, and each partition having an assigned portion of a CEC main storage (MS) used by the associated OS;

a plurality of channel processors provided for respectively controlling I/O channels in an I/O channel subsystem of the CEC, each channel processor sensing an amount of continuous busy time for each channel as a time segment of measurement for the channel, means for summing the time segments for each channel and recording the sum in a channel accumulation entry in a local storage of the channel, and recording a time stamp indicating a time for the occurrence of the end of the last time segment provided to the summing means;

a plurality of channel measurement facilities (CMFs) provided for the I/O channel subsystem of the CEC, the CMFs associated with the OSs to make measurements of utilization of the I/O channels by respective OS;

means for periodically transferring the content of the channel accumulation entries and the time stamp entry from the local storages of all channel processors to corresponding entries in the CMFs to obtain a collection of entries in each associated CMF for all channels used by the associated OS, the contents of the entries in each CMF representing the accumulated utilization time and time stamps from a last resetting of the contents of all entries in the CMF; and a CPU executing a CMF instruction for any OS to start an associated CMF, the associated CMF having all entries reset by a start command issued by the CMF instruction to start a measurement period from the time of execution of the CMF instruction, the CPU executing a CMF stop instruction to stop the measurement period after which the content of the associated CMF contains a measurement of channel utilization by the OS.

2. A means for measuring channel use time as defined in claim 1, further comprising:
an identified CMF being the CMF associated with the OS executing the CMF instruction and being identified by an OS identifier (IID).

3. A means for measuring channel use time as defined in claim 2, further comprising:
an identified CMF being a CMF other than the CMF associated with the OS executing the CMF instruction.

4. A means for measuring channel use time as defined in claim 1, further comprising:
a CPU executing a CMF instruction for any OS to test status of an identified CMF, means in the I/O processor for recording the identifier for each OS executing a CMF instruction to an identified CMF, means in the I/O processor for responding to the OS by indicating the status of the identified CMF in a command response block (CRPB) located in main storage at a location specified by the CMF instruction.

5. A method of measuring channel use time by a plurality of operating systems (OSs) sharing plural channels in a computer electronic complex (CEC), comprising the steps of:
structuring a logical channel measurement facility (CMF) for each of the plural OSs in the CEC; each of the OSs operating in a different logical resource partition in the CEC and having an assigned OS identifier (IID);
measuring by each channel processor in the CEC of each channel time segment used by the channel processor, each time segment being time measured during continuous operation of a channel processor for an OS,
accumulating for each channel processor all time segments used by the channel processor for each OS over a measurement period;
transferring accumulated time segments for each OS from each channel processor to each of a plurality of channel measurement facilities (CMFs) in the CEC for enabling each OS to access accumulated time segments for each channel processor used by the OS over a measurement period; and
independently controlling each of the plural CMFs by a hypervisor in the CEC issuing a command designating an IID assigned to the CMF for controlling the CMF, and a CMF not being changed by a commanded operation performed by any other CMF.

6. A method of measuring channel use time as defined in claim 5, further comprising the step of:
stopping the operation of any of the plurality of CMFs by the hypervisor issuing a stop command designating an IID assigned to the CMF, the stoppage of the CMF operation occurring regardless of the current operational state of the CMF without affecting the operation of any other CMF in the system.

7. A method of measuring channel use time as defined in claim 5, further comprising the step of:
resetting a state of any of the plurality of CMFs by the hypervisor issuing a reset command designating an IID assigned to the CMF, the CMF being reset regardless of the current state of the CMF and without affecting the operation of any other CMF in the system.

8. A method of measuring channel use time as defined in claim 5, further comprising the step of:
issuing a stop or reset command to any CMF in the CEC by either a microcode hypervisor or a software hypervisor to stop or reset, respectively, the state of the CMF without affecting the operation of any other CMF in the CEC.

9. A method of measuring channel use time as defined in claim 5, further comprising the step of:
executing a CMF instruction by a central processor (CPU) in the CEC for issuing a start command to activate the CMF to start a measurement period in which the CMF operates asynchronously, and the CPU being released from executing other instructions upon completion of the start command.

10. A method of measuring channel use time as defined in claim 9, further comprising the step of:
executing a CMF instruction by a central processor (CPU) in the CEC for issuing a stop command to deactivate the CMF to end the measurement period.

11. A method of measuring channel use time as defined in claim 5, further comprising the step of:
executing a CMF instruction by a central processor (CPU) in the CEC for issuing a test command to test the operating status of the CMF.

12. A method of measuring channel use time as defined in claim 11, further comprising the step of:
executing the test command to determine if the CMF is in an active state, a stopped state, or an error state.

13. A method of measuring channel use time as defined in claim 5, further comprising the step of:
dedicating an I/O channel processor for controlling each I/O channel; and
continuously measuring a current time segment while each channel processor is operating, during which a busy state exists for the channel processor.

14. A method of measuring channel use time as defined in claim 13, further comprising the step of:
executing a CMF start command only if a prior executed CMF test command indicates the CMF is in a stopped state and not in an error state.

15. A method of measuring channel use time as defined in claim 5, further comprising the step of:
sharing the CMFs by the channel processors in the CEC by accumulating time segments in each CMF for respective channel processors used by an OS associated with the CMF during a measurement period.

16. A method of measuring channel use time as defined in claim 5, further comprising the steps of:
identifying a CMF in a measurement command request control block (CRQB) located by a CMF instruction executed by an OS having the same identifier as assigned to the CMF; and
responding by the CMF to the OS executing the CMF instruction by providing measurements of channel utilization for the OS assigned to the CMF.

17. A method of measuring channel use time as defined in claim 16, further comprising the steps of:
identifying a CMF to perform a measurement command for a measurement command request control block (CRQB) located by a CMF instruction executed by an OS having a different identifier from the identifier assigned to the CMF; and responding by the CMF to the control program executing the CMF instruction by providing measurements of I/O channel utilization for the OS assigned to the CMF.

18. A method of measuring channel use time as defined in claim 17, further comprising the steps of:

providing an I/O processor to store the identifier of the OS issuing the measurement command to enable the I/O channel subsystem to respond to the OS issuing the command.

19. A method of measuring channel use time as defined in claim 18, further comprising the steps of:

providing an I/O processor to identify and access the CMF identified by the CRQB of the instruction executed by the OS.

20. A method of measuring channel use time as defined in claim 19, further comprising the steps of:

executing each CMF instruction in a central processor (CPU) of the CEC; and releasing the CPU for executing other CPU instructions independently of CMF measurement operations.

21. A method of measuring channel use time as defined in claim 20, further comprising the step of:

invoking by the I/O processor of each channel processor used by an identified CMF for the associated OS.

22. A method of measuring channel use time as defined in claim 21, further comprising the step of:

transferring each time segment of utilization time for each channel processor invoked by the I/O processor to an accumulation entry in a logical storage of the channel processor in which each transferred time segment is added to a previous value accumulated in the entry for providing accumulated channel time during a measurement period.

23. A method of measuring channel use time as defined in claim 22, further comprising the step of:

moving accumulated time segments from a local storage of each channel processor to a microcode storage entry for each channel processor in a collection of entries for each CMF from all channel processors in the CEC to generate a collection of all channel processor entries for all CMFs in the CEC to represent accumulated channel time for all channel processors for each CMF in the CEC.

24. A method of measuring channel use time as defined in claim 23, further comprising the step of:

periodically transferring accumulated time segments from the local storage of each channel processor to respective microcode storage entries for each of the CMFs in the CEC.

25. A method of measuring channel use time as defined in claim 24, further comprising the step of:

also periodically transferring the content of the respective microcode storage entries to channel entries in the CEC main storage assigned to the OSs executing CMF instructions to enable the OSs to access channel utilization time measured by accumulated time segments for each channel used by each OS.

26. A method of measuring channel use time as defined in claim 25, further comprising the steps of:

receiving by a channel measurement block (CMB) of respective microcode storage entries to perform the step of also periodically transferring entries in the CMB providing measured channel utilization time for all channel processors used by each OS in the CEC; and locating the CMB by an address in the CRQB.

27. A method of measuring channel use time as defined in claim 5, further comprising the step of:

operating each CMF independently of other CMFs to enable independent channel utilization time measurements for utilized I/O channel processors selected on an OS basis, including only the proportionate time a shared channel is being used by a respective OS.

28. A method of measuring channel use time as defined in claim 5, further comprising the steps of:

sharing a plurality of I/O channel processors among the OSs; and operating each CMF for an associated OS to measure the utilization time for shared I/O channel processors only while the channel processors are being used by the associated OS.

29. A method of measuring channel use time as defined in claim 5, further comprising the step of:

recording current clock values of a processor clock at a beginning time and an ending time of each time segment for each channel processor as time stamp entries for the channel processor.

30. A method of measuring channel use time as defined in claim 29, further comprising the step of:

accumulating time segments segment by subtracting the beginning time from the ending time, and adding the subtraction result to a current content of an accumulated utilization time field to obtain accumulated utilization time in an entry for the channel processor.

31. A method of measuring channel use time as defined in claim 30, further comprising the step of:

transferring a processor clock value as a time stamp into a clock register entry for each channel processor, and associated an OS identifier of an OS currently using the channel processor with the clock register entry.

32. A method of measuring channel use time as defined in claim 31, further comprising the step of:

periodically transferring the content of the time stamp from the clock register entry for each of plural channel processors to a corresponding channel processor entry in CMF storage for a CMF having an OS identifier equal to the OS identifier associated with the clock register entry, in which each CMF generates a collection of time stamps for all channel processors used by each CMF during a measurement period.

33. A method of measuring channel use time as defined in claim 32, further comprising the step of:

also periodically transferring the content of a collection of time stamps for each CMF from CMF storage to a storage accessible by each respective operating system executing a CMF instruction requesting measurements by the CMF.

34. A method of measuring channel use time as defined in claim 33, further comprising the steps of:

receiving by a channel measurement block (CMB) of respective microcode storage entries to perform the also periodically transferring step, for which entries in the CMB provides the time stamps for all channel processors in the CEC to respective OSs, and locating the CMB by an address in the CRQB.

35. A method of measuring channel use time as defined in claim 34, further comprising the step of:

grouping entries in each CMF for the different channel processors to contain both measured channel utilization time and the time stamps as a measurement of I/O activity for an associated OS.

* * * * *